United States Patent
Le Chevalier

(10) Patent No.: US 12,293,144 B2
(45) Date of Patent: May 6, 2025

(54) PRODUCING AUTOMATED SENSORY CONTENT AND ASSOCIATED MARKERS IN HTML DOCUMENT PUBLISHING

(71) Applicant: Chegg, Inc., Santa Clara, CA (US)

(72) Inventor: Vincent Le Chevalier, Waikoloa, HI (US)

(73) Assignee: Chegg, Inc., Santa Clara, CA (US)

( * ) Notice: Subject to any disclaimer, the term of this patent is extended or adjusted under 35 U.S.C. 154(b) by 37 days.

(21) Appl. No.: 18/200,670

(22) Filed: May 23, 2023

(65) Prior Publication Data

US 2023/0376675 A1  Nov. 23, 2023

Related U.S. Application Data

(63) Continuation of application No. 16/912,059, filed on Jun. 25, 2020, now Pat. No. 11,699,023.

(60) Provisional application No. 62/869,925, filed on Jul. 2, 2019.

(51) Int. Cl.

| | |
|---|---|
| G06F 40/117 | (2020.01) |
| G06F 3/0483 | (2013.01) |
| G06F 40/103 | (2020.01) |
| G06F 40/134 | (2020.01) |
| G06F 40/14 | (2020.01) |
| G06F 40/169 | (2020.01) |

(Continued)

(52) U.S. Cl.
CPC .......... *G06F 40/117* (2020.01); *G06F 3/0483* (2013.01); *G06F 40/103* (2020.01); *G06F 40/134* (2020.01); *G06F 40/14* (2020.01); *G06F 40/169* (2020.01); *G06F 40/20* (2020.01); *G06F 40/40* (2020.01)

(58) Field of Classification Search
CPC ...... G06F 40/117; G06F 40/14; G06F 3/0483; G06F 40/40; G06F 3/011; G06F 40/103; G06F 40/20; G06F 40/284; G06F 30/14
See application file for complete search history.

(56) References Cited

U.S. PATENT DOCUMENTS

| | | |
|---|---|---|
| 6,725,399 B1 | 4/2004 | Bowman |
| 7,418,656 B1 | 8/2008 | Peterson |
| 9,197,660 B2 | 11/2015 | Sun et al. |

(Continued)

FOREIGN PATENT DOCUMENTS

| | | |
|---|---|---|
| EP | 2344038 A2 | 7/2011 |
| WO | 2010047832 A2 | 4/2010 |

OTHER PUBLICATIONS

Jaligama et al., "An Online Virtual Learning Environment for Higher Education," 2011 Third International Conference on Games and Virtual Worlds for Serious Applications, copyright 2011 IEEE, p. 207-214. (Year: 2011).

(Continued)

*Primary Examiner* — Asher D Kells
(74) *Attorney, Agent, or Firm* — Sheppard Mullin Richter & Hampton LLP

(57) ABSTRACT

A sensory content production system generates sensory associated with concepts identified in an electronic document. Definitions of each concept are identified, and the concepts are stored in connection with their associated definitions. Sensory content is generated for the concepts and concepts definitions and stored in connection with each other in a sensory content layer. Availability of sensory content is indicated to users by interactive markers.

18 Claims, 14 Drawing Sheets

(51) Int. Cl.
*G06F 40/20* (2020.01)
*G06F 40/40* (2020.01)

(56) References Cited

U.S. PATENT DOCUMENTS

| | | |
|---|---|---|
| 9,282,100 B2 | 3/2016 | Clark et al. |
| 2003/0146977 A1 | 8/2003 | Vale et al. |
| 2004/0216032 A1 | 10/2004 | Amitay et al. |
| 2005/0208461 A1 | 9/2005 | Krebs et al. |
| 2006/0041538 A1 | 2/2006 | King et al. |
| 2006/0048096 A1 | 3/2006 | Jiang et al. |
| 2006/0277080 A1 | 12/2006 | DeMartine et al. |
| 2007/0099161 A1 | 5/2007 | Krebs et al. |
| 2009/0031402 A1 | 1/2009 | Jung et al. |
| 2009/0089654 A1 | 4/2009 | Wittig et al. |
| 2009/0306959 A1 | 12/2009 | Rappoport et al. |
| 2010/0082677 A1 | 4/2010 | Athsani et al. |
| 2010/0198825 A1 | 8/2010 | Chan et al. |
| 2011/0223576 A1 | 9/2011 | Foster et al. |
| 2016/0117301 A1 | 4/2016 | Chan |
| 2016/0170484 A1* | 6/2016 | Flawn .............. G06F 3/0304 |
| | | 345/156 |
| 2017/0019421 A1 | 1/2017 | Hebert et al. |
| 2017/0060829 A1* | 3/2017 | Bhatt .............. G06F 40/169 |
| 2017/0255626 A1* | 9/2017 | Berry .............. G06F 16/955 |
| 2018/0018349 A1 | 1/2018 | Liu et al. |
| 2019/0303448 A1 | 10/2019 | Colangelo |
| 2020/0327375 A1 | 10/2020 | Naveh et al. |

OTHER PUBLICATIONS

Qian et al., "Automated Testing and Smart Tutoring System for Web Application," 2008 International Workshop on Education Technology and Training & 2008 International Workshop on Geoscience and Remote Sensing, copyright 2008 IEEE, p. 582-585. (Year: 2008).

\* cited by examiner

| Original Document Structure | Page 1 | Page 2 | Page 3 | Page 4 | Page 5 | Page 6 | Page 7 | Page 8 | Page 9 |
|---|---|---|---|---|---|---|---|---|---|
| Document Layer 310 | P1 | P2 | P3 | P4 | P5 | P6 | P7 | P8 | P9 |
| User Generated Content Layer 315 | | U2 | | U4 | | | U7 | | |
| Learning Activities Layer 318 | | | L3a, L3b | | L5 | | | | |
| Concept Layer 320 | | C2 | C3a, C3b | | C2 | C6 | | C8 | |
| Concept Definition Layer 330 | | D2 | D3a, D3b | | D2 | D6 | | D8 | |
| Sensory Layer for concept 440a | | S_C2 | S_C3a, S_C3b | | S_C2* | S_C6 | | S_C8 | |
| Sensory Layer for concept definition 445a | | S_D2 | S_D3a, S_D3b | | S_D2* | S_D6 | | S_D8 | |
| Sensory Layer for concept 440b | | T_C2 | T_C3a, T_C3b | | T_C2* | T_C6 | | T_C8 | |
| Sensory Layer for concept definition 445b | | T_D2 | T_D3a, T_D3b | | T_D2* | T_D6 | | T_D8 | |
| Aggregate Layer 350 | | U2, C2, D2, S_C2, S_D2, T_C2, T_D2 | L3a, L3b, C3a, C3b, D3a, D3b, S_C3a, S_D3a, S_C3b, S_D3b, T_C3a, T_D3a, T_C3b, T_D3b | U4 | L5, C2, D2, S_C2*, S_D2*, T_C2*, T_D2* | C6, D6, S_C6, S_D6, T_C6, T_D6 | U7 | C8, D8, S_C8, S_D8, T_C8, T_D8 | |

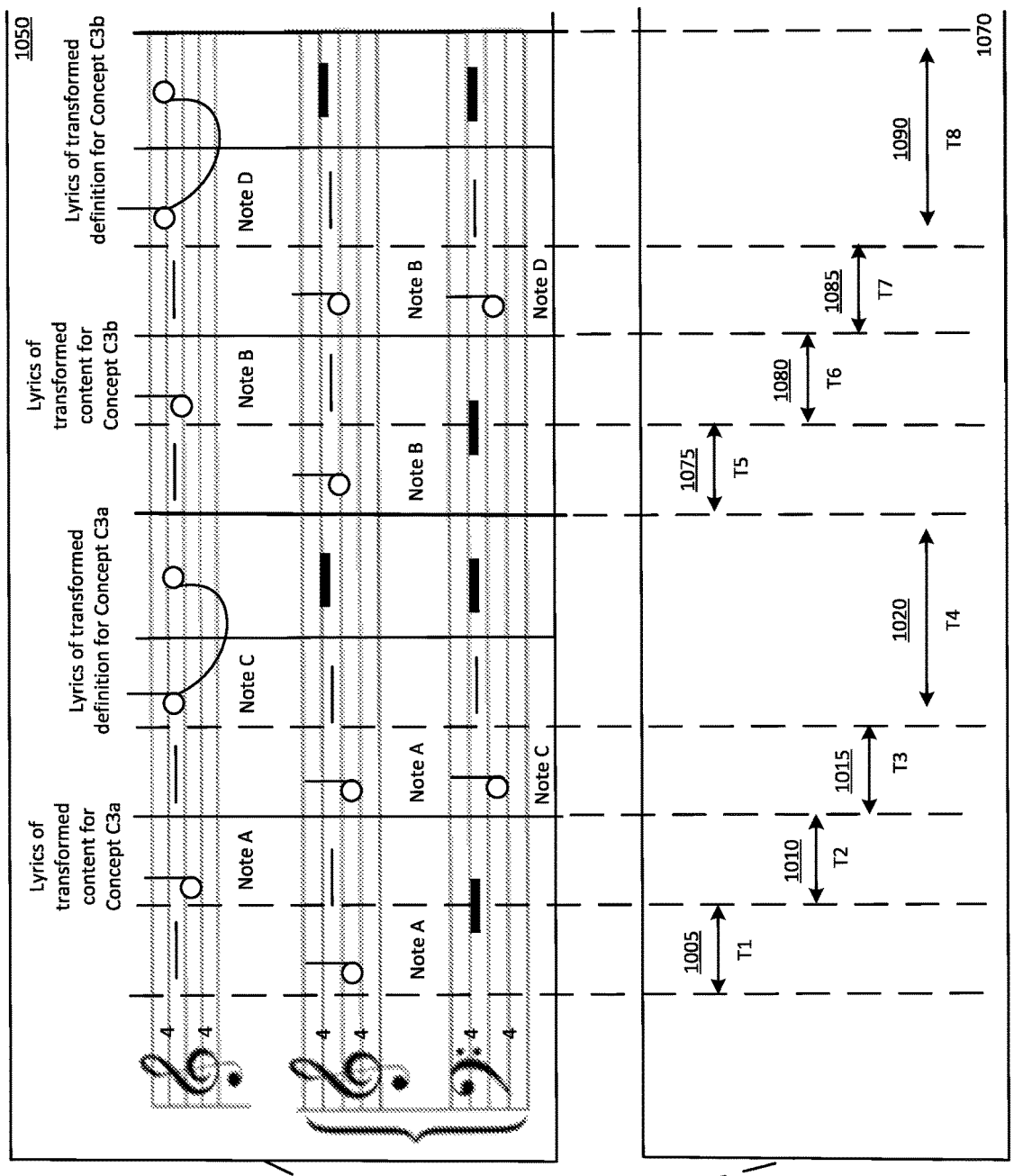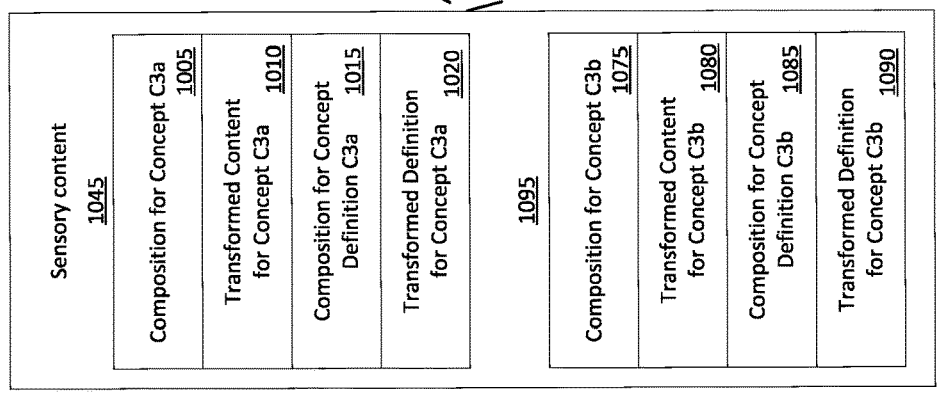
FIG. 10B

PRODUCING AUTOMATED SENSORY CONTENT AND ASSOCIATED MARKERS IN HTML DOCUMENT PUBLISHING

CROSS REFERENCE TO RELATED APPLICATIONS

This application is a continuation application of U.S. patent application Ser. No. 16/912,059, filed Jun. 25, 2020, which claims priority to U.S. Provisional Patent Application No. 62/869,925, filed on Jul. 2, 2019. The entire contents of all of the above-identified applications are incorporated herein by reference for all purposes.

BACKGROUND

Field of the Invention

This invention relates to production, delivery, and consumption of automated sensory content associated with concepts occurring in electronic documents and automated interactive markers indicating availability of the sensory content.

Description of the Related Art

The rapid shift to mobile Internet services is bringing content offerings to an increasingly larger number of connected devices. Experiences previously limited to a single device are now accessible across multiple devices as high volume consumer electronic platforms such as Smart Phones, tablets, eReaders, game systems, and Internet TVs have become new channels to receive digital documents and services. Popular electronic book services leverage standardized publishing formats to seamlessly integrate and synchronize digital document reading experiences across consumer devices.

As digital documents are shifting from a static model to a connected one where related, personalized, and other social content are being aggregated dynamically within the original document, it becomes strategic for publishing platforms and their distribution systems to be able to properly author and manage these new individual content layers among a plurality of users. But, even as new digital content services are progressively embedded within the original document, there has been little emphasis in new types of content services that assist readers in retaining, understanding, and mastering content. Furthermore, while providing excellent user reading experience for this new digital medium remains a focus of the commercially available eReading systems and applications, it has been so far much more difficult to fully makes these documents accessible to disabled readers, such as those with physical, mental, or learning disabilities.

BRIEF DESCRIPTION OF THE DRAWINGS

FIG. 4 illustrates layers of a multilayered document, according to one embodiment.

FIG. 9 is a screen shot illustrating a user interface for presenting concepts, according to one embodiment.

FIGS. 10A and 10B illustrate musical notation for western classical sensory content, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Embodiments of the present invention provide a method for automatically generating sensory content and interactive markers in an electronic document, such as a HTML document. In some embodiments, an interactive marker indicates the presence of sensory information related to a particular concept occurring at a particular location in the electronic document. In some embodiments, a concept may include a topic, a keyword, or subject, and the location may be a particular page, paragraph, line, section, chapter, etc.

The interactive markers may be available in one or more interactive marker classes, where each class corresponds to a human sense. Accordingly, a first interactive marker class corresponds to hearing, and is referred to herein as the hearing interactive marker class. A second interactive marker class corresponds to smell, and is referred to herein as the smell interactive marker class. A third interactive marker class corresponds to touch, and is referred to herein as the touch interactive marker class. A fourth interactive marker class corresponds to sight, and is referred to herein as the sight interactive marker class.

One or more different interactive marker types may be available for a particular interactive marker class. For example, interactive marker types for the hearing sensor marker class may include bells, animal sounds, bird sounds, nature sounds, ring tones, classical music, instrumental music, vocal music, cartoon voices, human voices, and other sounds. Sensory marker types for the touch sensor marker class may include braille, or other tactile systems.

Sensory marker types for the smell sensor marker class may include scents, such as nature scents, food scents, perfumes, etc. Sensory marker types for the sight sensor marker class may include animations, pictures, videos, emoticons, cartoons, pictograms, etc.

Each interactive marker type within an interactive marker class has one or more attributes. For example, hearing interactive marker types within the hearing interactive marker class may have the following attributes and associated values: pitch, timbre, volume, and duration.

The interactive markers indicate the presence of sensory information associated with concepts appearing in a location (such as, page) being viewed or otherwise rendered by a user. In some embodiments, the interactive markers are mapped into the original document, and as a concept is encountered in the document, the corresponding interactive marker and sensory content are automatically rendered.

Figure 1:
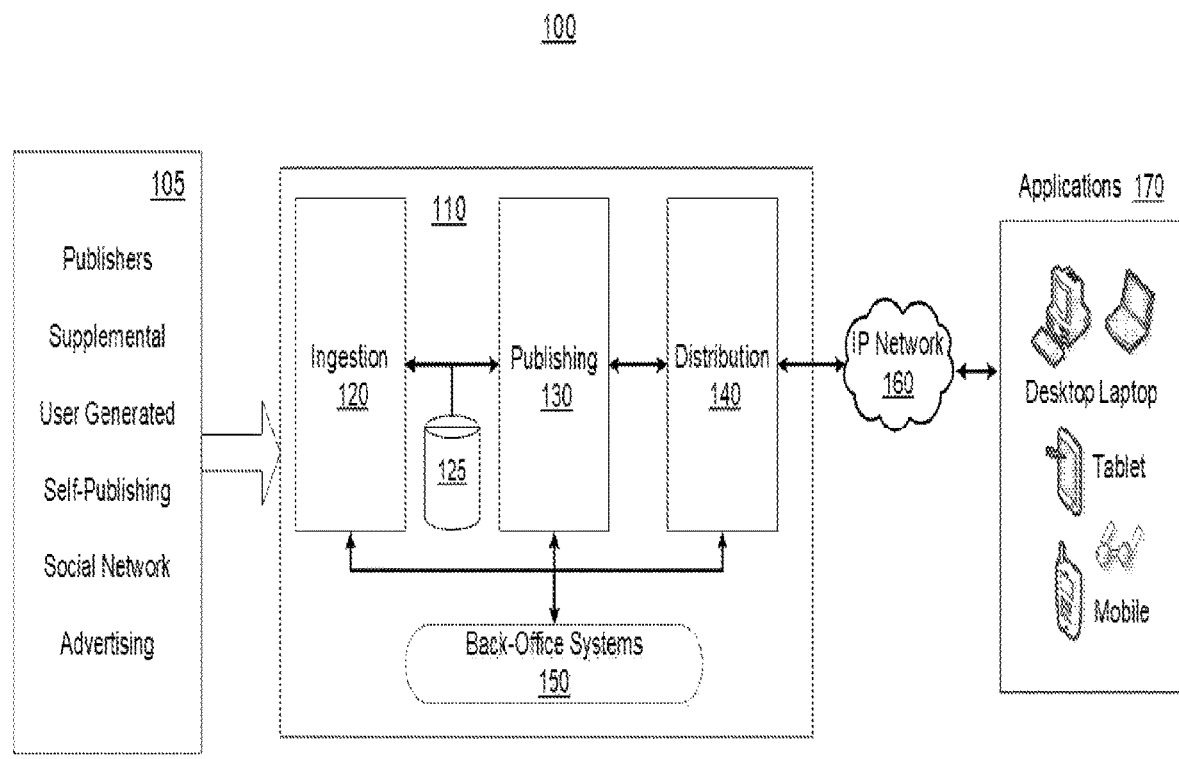
FIG. 1 illustrates an example publishing platform, according to one embodiment.

The method is organized around an educational digital publication and reading platform configured to aggregate, manage, and distribute multilayered content. FIG. 1 is a high-level block diagram illustrating a reading environment 100.

Content block 105 gathers and aggregates content from a large number of sources, categories, and partners. Whether the content is curated, perishable, on-line, or personal, content block 105 includes the interfaces and processes to automatically collect various content sources into a formalized staging environment. As illustrated, multiple types of content may be gathered, including: content from a document publisher's catalog; external supplemental content that supplements data in the document publisher's catalog, such as, from dictionaries, Wikipedia, etc.; user-generated content such as notes, highlights, etc.; self-published content such as blog content; content shared between users or generated by a user's activities on a social network; advertising data; and so on.

Educational digital publication and reading platform 110 comprises the following blocks with respective submodules: ingestion module 120, publishing system 130, distribution system 140, and back office system 150. Ingestion module 120 ingests published documents that may be in a variety of different formats, such as PDF, ePUB2, ePUB3, SVG, XML, or HTML. The ingested document may be a book, such as a textbook, a set of self-published notes, or any other published document, and may be subdivided in any manner. For example, the document may have a plurality of pages organized into chapters, which could be further divided into one or more sub-chapters. Each page may have text, images, tables, graphs, or other items distributed across the page.

Figure 2:
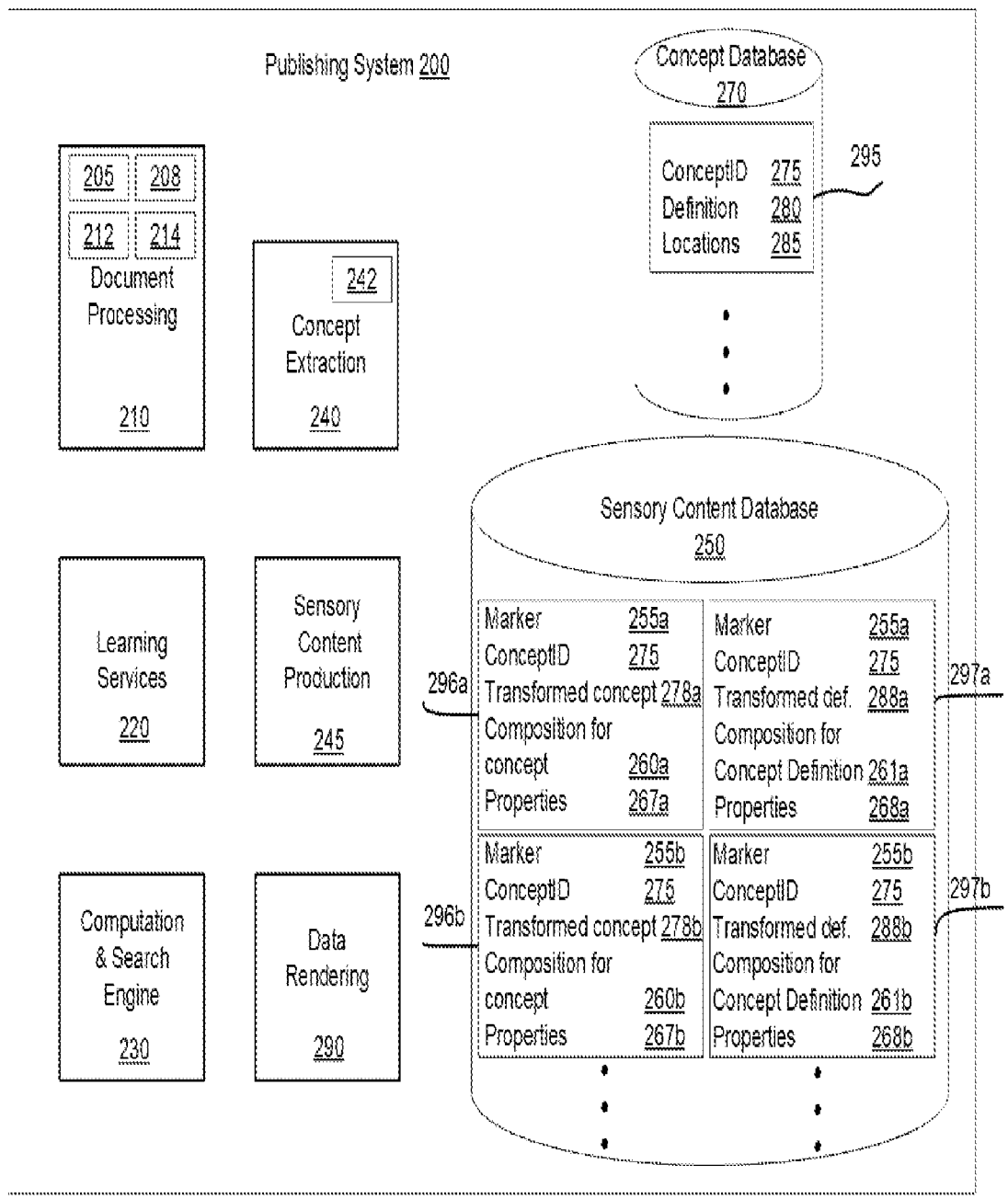
FIG. 2 is a block diagram illustrating modules within a publishing system, according to one embodiment.

Ingested content is stored in a content database 125 and is accessed by the publishing system 130, which includes several subsystems, and is described further with reference to FIG. 2. Publishing system 130 processes and transforms ingested content from ingestion module 120 and outputs a set of services that can be distributed to an end user by distribution system 140.

In accordance with some embodiments of the present invention, the publishing system 130 aggregates one or more additional content layers from numerous sources into the ingested or reconstructed document, whether the ingested document is in a markup language document or has been reconstructed by the publishing system 130. One of these layers is an interactive marker content layer, and is discussed further with reference to FIGS. 3 and 4. Additional layers may include: other related content, advertising content, social content, and user-generated content, may be added to the document to create a dynamic, multilayered document. For example, related content may comprise material supplementing the foundation document, such as study guides, self-testing material, solutions manuals, glossaries, or journal articles. Advertising content may be uploaded by advertisers or advertising agencies to the publishing platform, such that advertising content may be displayed with the document. Social content may be uploaded to the publishing platform by the user or by other nodes (e.g., classmates, teachers, authors, etc.) in the user's social graph. Examples of social content include interactions between users related to the document and content shared by members of the user's social graph. User-generated content includes annotations made by a user during an eReading session, such as highlighting or taking notes. In one embodiment, user-generated content may be self-published by a user and made available to other users as a related content layer associated with a document or as a standalone document.

As layers are added to the electronic document, page information and metadata of the document are referenced by all layers to merge the multilayered document into a single reading experience. Publishing system 130 may also add information describing the supplemental layers to a reconstructed document's table of contents. Because the page-based document ingested into the ingestion module 120 or the reconstructed document generated by the publishing system 130 is referenced by all associated content layers, the ingested or reconstructed document is referred to herein as a "foundation document," while the "multilayered document" refers to a foundation document and the additional content layers associated with the foundation document.

Distribution system 140 packages content for delivery, uploads the content to content distribution networks, and makes the content available to end-users based on the content's digital rights management policies. Distribution system 140 handles end users' requests for content, determines whether the end users have authorization to access the content, and delivers the right content to the right device based on the authorization.

Back-office system 150 enables business processes such as human resources tasks, sales and marketing, customer and client interactions, and technical support. Back-office system 150 interfaces with publishing system 130, and distribution system 140 to integrate marketing, selling, servicing, and receiving payment for digital products and services.

Distribution block 140 distributes content for user consumption by, for example, pushing content to edge servers on a content delivery network, such as IP network 160. An application 170 manages user interaction with the platform 110 by accessing content, updating content, reporting users' reading activities, and assessing network performance. In addition, sensory content can be rendered by connected speakers, desktops, laptops, tablets, mobile devices, smart watches and other types of connected wearable devices, connected Braille typewriter, Braille smartwatch, other connected devices, and so on.

Publishing System

Publishing system 200 receives original documents for reconstruction from ingestion module 120 illustrated in FIG. 1. In one embodiment, a series of modules of publishing system 200 are configured to perform the document reconstruction process.

FIG. 2 illustrates modules within publishing system 200, which in one embodiment includes document processing module 210, learning services module 220, computation and search engine module 230, concept extraction system 240, sensory content production module 245, and data rendering module 290. The publishing system 200 also includes a concept database 270 and a sensory content database 250. Operation of publishing system 200 and its various components is now described with reference to FIG. 8, which depicts a method 800 of generating concept records in accordance with certain embodiments.

Method 800 begins with document processing module 210 reconstructing a foundation document at 810. If the document ingested by ingestion module 120 is not in a markup language format, document processing module 210 automatically identifies, extracts, and indexes all the key elements and composition of the document to reconstruct it into a modern, flexible, and interactive HTML5 format. The ingested documents are converted into markup language documents well-suited for distribution across various computing devices. In one embodiment, the document processing module 210 reconstructs published documents so as to accommodate dynamic add-ons, such as user-generated and related content, while maintaining page fidelity to the original document. The transformed content preserves the original page structure including pagination, number of columns and arrangement of paragraphs, placement and appearance of graphics, titles and captions, and fonts used, regardless of the original format of the source content and complexity of the layout of the original document.

The page structure information is assembled into a document-specific table of contents describing locations of chapter headings and sub-chapter headings within the reconstructed document, as well as locations of content within each heading. During reconstruction, document metadata describing a product description, pricing, and terms (e.g., whether the content is for sale, rent, or subscription, or whether it is accessible for a certain time period or geographic region, etc.) may also added to the reconstructed document.

The reconstructed document may have a table of content and/or glossary that indexes the content of the document, including interactive marker content, into a description of the overall structure of the document, including chapter headings and sub-chapter headings. Within each heading, the table of content and/or glossary identifies the structure of each page. As content, including interactive marker content, is added dynamically to the reconstructed document, the content is indexed and added to the table of contents and/or glossary to maintain a current representation of the document's structure. Embodiments are described herein with reference to an original document in the Portable Document Format (PDF) that is ingested into publishing system 200. However, the format of the original document is not limited to PDF; other unstructured document formats can also be reconstructed into a markup language format by a similar process.

A PDF page contains one or more content streams, which include a sequence of objects, such as path objects, text objects, and external objects. A path object describes vector graphics made up of lines, rectangles, and curves. Path can be stroked or filled with colors and patterns as specified by the operators at the end of the path object. A text object comprises character stings identifying sequences of glyphs to be drawn on the page. The text object also specifies the encodings and fonts for the character strings. An external object XObject defines an outside resource, such as a raster image in JPEG format. An XObject of an image contains image properties and an associated stream of the image data.

In some embodiments, reconstruction at 810 includes image extraction by image extraction module 205 and text extraction by text extraction module 208.

Image extraction module 205 identifies graphical objects within a page and determines their respective regions and bounding boxes. In one embodiment, the image extraction process performed by image extraction module 205 first identifies graphical operations within the page. For example, a path object in a PDF page may include multiple path construction operators that describe vector graphics made up of lines, rectangles, and curves.

Image extraction module 205 also extracts metadata associated with each of the images in the document page, such as resolutions, positions, and captions of the images. Resolution of an image is often measured by horizontal and vertical pixel counts in the image; higher resolution means more image details. The image extraction process may extract the image in the original resolution as well as other resolutions targeting different eReading devices and applications. For example, a large XVGA image can be extracted and down sampled to QVGA size for a device with QVGA display. Image extraction module 205 also determines the position information of each image. The position information of the images can be used to provide page fidelity when rendering the document pages in eReading browser applications, especially for complex documents containing multiple images per page. The image extraction component may also extract a caption associated with each image that defines the content of the image by searching for key words, such as "Picture", "Image", and "Tables", from text around the image in the original page. The extracted image metadata for the page may be stored to the overall document metadata and indexed by the page number.

The image extraction module 205 may also extract tables, comprising graphics (horizontal and vertical lines), text rows, and/or text columns. The lines forming the tables can be extracted and stored separately from the rows and columns of the text.

The image extraction may be repeated for all the pages in the ingested document until all images in each page are identified and extracted. At the end of the process, an image map that includes all graphics, images, tables and other graphic elements of the document is generated for the eReading platform.

Text extraction component 208 of document processing module 210 extracts text and embedded fonts from the original document and identifies the location of the text elements on each page. In one embodiment, the text extraction component determines a Unicode character mapping for each glyph in a document to be reconstructed. The mapping ensures that no two glyphs are mapped to a same Unicode character. To achieve this goal, the text extraction component defines and follows a set of rules including applying the Unicode mapping found in the embedded font file; determining the Unicode mapping by looking up postscript character names in a standard table, such as a system TrueType font dictionary; and determining the Unicode mapping by looking for patterns, such as hex codes, postscript name variants, and ligature notations.

For those glyphs or symbols that cannot be mapped by following the above rules, the text extraction component may apply pattern recognition techniques on the rendered font to identify Unicode characters. If pattern recognition is still unsuccessful, the text extractor 210 may map the unrecognized characters into the private use area (PUA) of Unicode. In this case, the semantics of the characters are not identified, but the encoding uniqueness is guaranteed. As such, rendering ensures fidelity to the original document.

The text extraction component 208 tags the pages in the original document having text. In one embodiment, the text extraction component identifies all the pages with one or more text objects in the original document. Alternatively, the text extraction component 208 may mark only the pages without any embedded text.

The text extraction component 208 extracts text from the pages of the original document tagged as having text. The text extraction may be done at the individual character level, together with markers separating words, lines, and paragraphs. The extracted text characters and glyphs are pointed to by the Unicode character mapping determined for each. The position of each character is identified by its horizontal and vertical locations within a page. For example, if an original page is in A4 standard size, the location of a character on the page can be defined by its X and Y location relative to the A4 page dimensions. In one embodiment, text extraction is performed on a page-by-page basis. The text extraction component 208 may also extract embedded fonts from the original document, which are stored and referenced by client devices for rendering the text content.

The output of the text extraction component 208 is, therefore, a dataset referenced by the page number, comprising the characters and glyphs in a Unicode character mapping with associated location information and embedded fonts used in the original document.

A text coalescence module 212 of the document processing module 210 coalesces the text characters extracted by text extraction component. In one embodiment, the text coalescing module assembles the extracted text characters into words, words into lines, lines into paragraphs, and paragraphs into bounding boxes and regions. These steps leverage the known attributes about extracted text in each page, such as information on the text position within the page, text direction (e.g., left to right, or top to bottom), font type (e.g., Arial or Courier), font style (e.g., bold or italic), expected spacing between characters based on font type and style, and other graphics state parameters of the pages.

In one embodiment, the text coalescence module 208 assembles extracted text characters into words based on spacing. The text coalescence module may analyze the spacing between adjacent characters and compare the spacing to the expected character spacing based on the known text direction, font type, style, and size, as well as other graphics state parameters, such as character-spacing and zoom level. Despite different rendering engines adopted by the eReading applications 170, the average spacing between adjacent characters within a word is smaller than the spacing between adjacent words. For example, a string of "Berriesaregood" represents extracted characters without considering spacing information. Once taking the spacing into consideration, the same string becomes "Berries are good," in which the average character spacing within a word is smaller than the spacing between words.

The text coalescence module 208 may additionally or alternatively assemble extracted text characters into words based on semantics. For example, the string of "Berriesaregood" may be input to a semantic analysis tool, which matches the string to dictionary entries or Internet search terms, and outputs the longest match found within the string. The outcome of this process is a semantically meaningful string of "Berries are good." In one embodiment, the text coalescence module 208 analyzes the same text by both spacing and semantics, so that word grouping results may be verified and enhanced.

The text coalescence module 208 assembles words into lines by determining an end point of each line of text. Based on the text direction, the text coalescence module computes and averages the horizontal spacing between words. The end point may have word spacing larger than the average spacing between words. For example, in a two-column page, the end of the line of the first column may be identified based on it having a spacing value much larger than the average word spacing within the column. On a single column page, the end of the line may be identified by the space after a word extending to the side of the page or bounding box.

After determining the end point of each line, the text coalescence module assembles lines into paragraphs. Based on the text direction, the text coalescence module 208 may compute and average the vertical spacing between consecutive lines. The end of the paragraph may have a vertical spacing that is larger than the average. Additionally or alternatively, the text coalescence module may apply semantic analysis to relate syntactic structures of phrases and sentences, so that meaningful paragraphs can be formed.

The text coalescence module 208 may assemble the identified paragraphs into bounding boxes or regions. In one embodiment, the paragraphs may be analyzed based on lexical rules associated with the corresponding language of the text. The text coalescence module 208 may execute a semantic analyzer to identify punctuation at the beginning or end of a paragraph. For example, a paragraph may be expected to end with a period. If the end of a paragraph does not have a period, the paragraph may continue either on a next column or a next page. The text coalescence module 208 may analyze the syntactic structures of the paragraphs to determine the text flow from one paragraph to the next, and may combine two or more paragraphs based on the syntactic structure. If multiple combinations of the paragraphs are possible, the text coalescence module 208 may reference an external lexical database, such as WORD-NET®, to determine which paragraphs are semantically similar.

An output of the document processing system 210 at block 810 is the reconstructed HTML document layer, such as the foundation document layer 310, discussed with reference to FIG. 3. In some embodiments, the foundation documents are stored in the content database 125, illustrated in FIG. 1.

The reconstructed HTML document layer may also include a table of contents. In some embodiments, document processing system 210 includes a table of contents optimizer 214 that indexes content of the reconstructed document. In one embodiment, the table of contents optimizer 214 aggregates the indexed content into a document-specific table of contents that describes the structure of the document at the page level. For example, when converting printed publications into electronic documents with preservation of page fidelity, it may be desirable to keep the digital page numbering consistent with the numbering of the original document pages.

The table of contents optimizer 214 may optimize different levels of the table. At the primary level, the table of contents optimizer searches for chapter headings within the original document, such as headings for a preface, chapter numbers, chapter titles, an appendix, and a glossary. The table of contents optimizer 214 may identify a chapter heading based on the spacing between chapters. Alternatively, the table of contents optimizer may identify a chapter heading based on the font face, including font type, style, weight, or size. For example, the headings may have a font face that is different from the font face used throughout the rest of the document. After identifying the headings, the table of contents optimizer 214 retrieves the number of the page on which each heading is located.

At a secondary level, the table of contents optimizer 214 searches for sub-chapter headings within the original document, such as dedications and acknowledgments, section titles, image captions, and table titles. The table of contents optimizer 214 may determine the vertical spacing between sections and segment each chapter according to the section spacing. Based on text at the beginning of each section, for example, the table of contents optimizer identifies a sub-chapter heading font face. The table of contents optimizer 214 may parse each chapter to identify all occurrences of the sub-chapter heading font face, and determine the page number associated with each identified sub-chapter heading.

Figure 8:
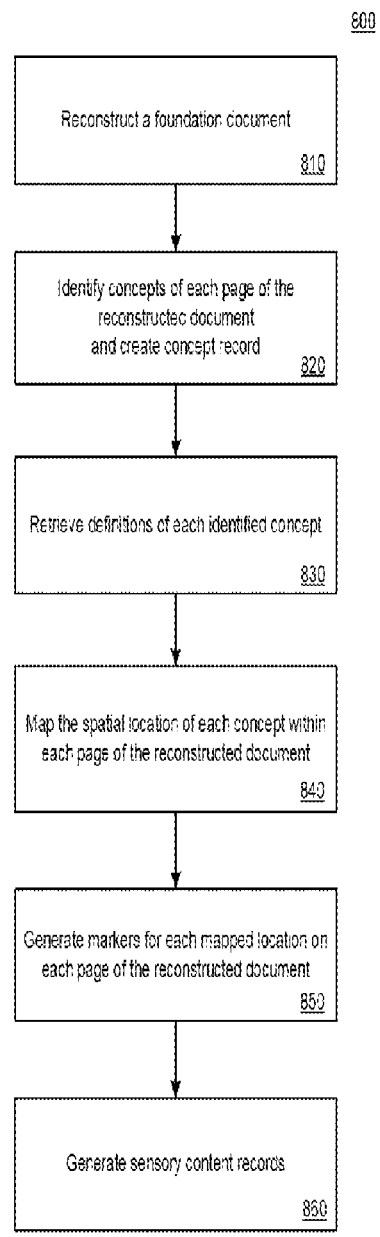
FIG. 8 is a flowchart illustrating a method for generating concept records and concept definition records, according to one embodiment.

In some embodiments, not shown in FIG. 8, learning services system 220 of publishing system 130 uses the foundation document reconstructed by the document processing system 210 as well as other content ingested by the ingestion module 120 to generate a set of learning activities that can be presented to a user. The set of learning activities may be stored in the content database 125. The result of learning services system 220 is one or more content layers, such as the learning activities layer 318 illustrated in FIG. 3.

At 820, concept extraction system 240 identifies one or more of concepts, primary terms and keywords, all of which are referred herein as "concept" 295, for each page (or other section) of foundation documents stored in content database 125. In some embodiments, concept extraction system 240 also identifies concepts in other documents stored in content database 125, as well in learning activities stored in content database 125. In some embodiments, concept extraction system 240 utilizes machine learning techniques to determine concepts found in a document. In addition or in the alternative, concept extraction system 240 identifies concepts of a foundation document by accessing a glossary associated with the document. In some embodiments, concept extraction system 240 identifies concepts of a foundation document by accessing concepts found in other foundation documents that are similar to the foundation document.

Concept extraction system 240 may identify relevant additional concept content by querying content external to the foundation document. In one embodiment, concept extraction system 240 may feed identified concepts into an online translation system. For example, by feeding concepts into a dictionary for a language other than the language of the foundation document, the concept extraction system 240 translates the concepts from their original language into a foreign language. In another embodiment, the concept extraction system 240 may feed the concepts into an online thesaurus to retrieve associated synonyms and/or antonyms. In yet another embodiment, the concept extraction system 240 retrieves concepts from concepts associated with similar foundation documents. The similarity of foundation documents may be determined based on subject matter of the documents. For example, a "Biology 101" textbook may be similar to "Biology 102" and "Biology 103" textbooks based on the three textbooks sharing the subject matter of biology. The concept extraction system 240 may identify concept definition 280 associated with concepts 295 in "Biology 101" by retrieving concepts and supplemental concept content found in and associated with each of the "Biology 102" and "Biology 103" textbooks. In some embodiments, concept extraction system 240 disambiguates between different concepts having the same or similar names based on a domain to which the textbook pertains. As an example, if the textbook is a film history textbook, then a concept called "gravity" may refer to the 2014 film called Gravity. On the other hand, if the textbook is a physics textbook, then the concept called "gravity" may refer to the force of attraction between two bodies.

In some embodiments, at 820, the concept extraction system 240 stores a plurality of concept records 295 in concept database 270. Each concept record 295 corresponds to a unique concept, and is identifiable using a concept identifier 275, such as concept name. In some embodiments, the concept identifier 275 takes into account a domain to which the concept belongs. Continuing the previous example of the concept "gravity" that occurs in two domains—film history and physics, a corresponding concept identifier may be "gravity—film history" and "gravity—physics."

At 830, the concept definition system 242 identifies relevant supplemental content associated with the concepts. This supplemental concept content is referred to as concept definitions 280, and may include: (i) definitions (e.g., as may be found in the glossary, or from external dictionary sources), (ii) examples that help illustrate the concept, (iii) quizzes, tests, questions, problems, etc., and other content that provides supplementary information for a concept and helps a reader understand the concept. In some embodiments, at 830, the concept records 295 are updated to store concept definitions 280.

At 840, for each concept extracted by concept extraction system 240, document processing module 240 determines a corresponding spatial location 285. An example of a spatial location may be x-y co-ordinates of a specific page in proportion of the page size being determined. In some embodiments, at 840, the concept records 295 are updated to store corresponding spatial location 285.

Accordingly, concept database 270 stores a plurality of concept records 295. Each concept record 295 corresponds to a unique concept, and includes such information as: a concept name or other identifier 275, concept definitions 280, and associated spatial location(s) 285 for the concept in relation to every spatial location in a foundation document in which it occurs. In one embodiment, the concept extraction system 240 associates each concept 295 in the concept database 270 with metadata identifying the page(s) or other spatial location(s) of the foundation document on which the concept exists or appears. Accordingly, concept database 270 may store a plurality of concept records 295, each concept record including such information as: concept name or other identifier 275; concept definition 280; and one or more spatial locations 285 where concept 295 occurs in one or more documents in content database 125. In some embodiments, the publishing system 130 includes several concept databases 270, where each concept database is specific to a particular content domain. For example, one domain might be physics and another film history.

Figure 9:
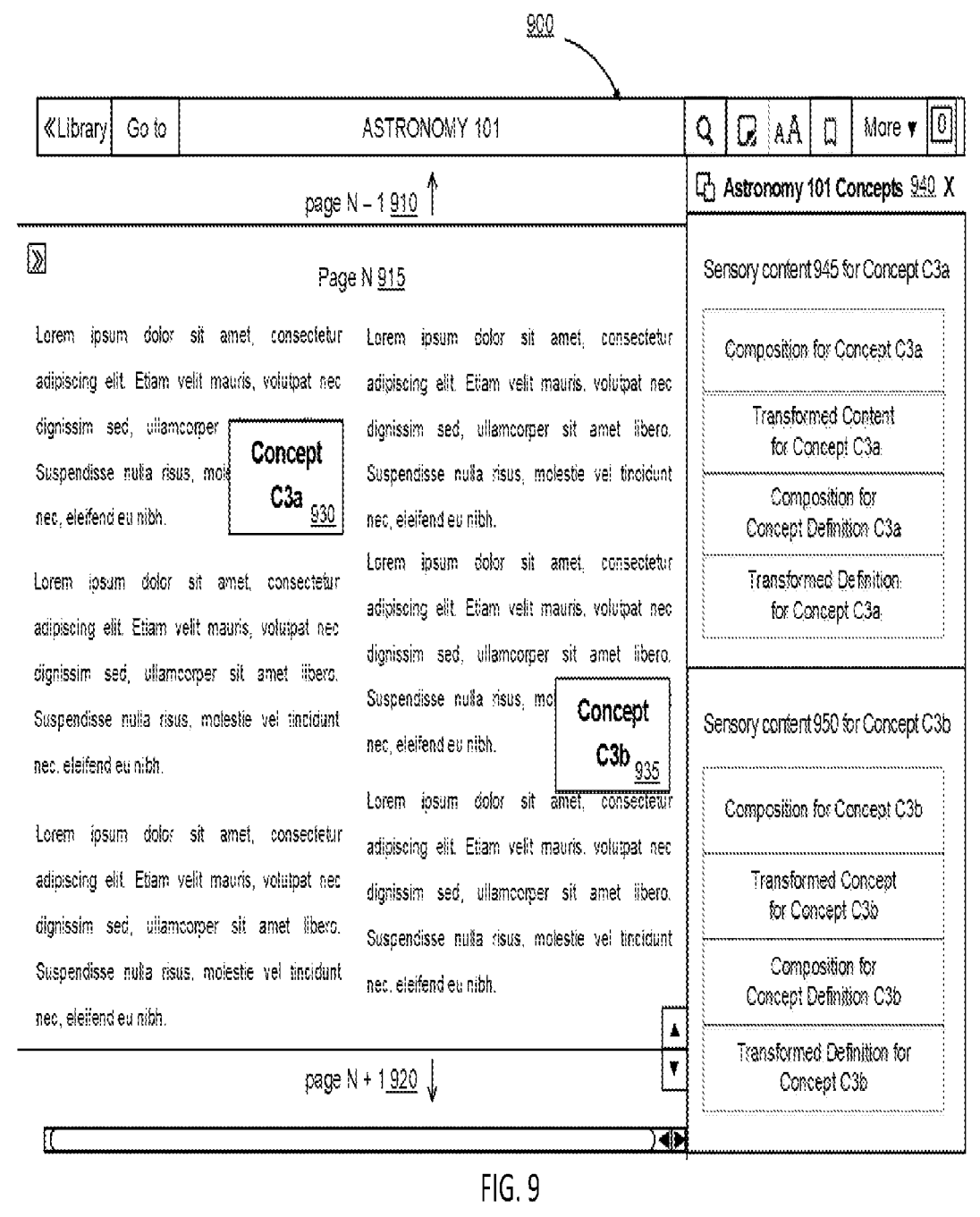

At 850, for each spatial location determined at block 840, an interactive marker 255 is created by computation and search engine module 230. The interactive marker 255 includes at least one user interface element that is used to indicate the presence of certain information. The interactive marker 255 also acts as a pointer to the associated spatial location and can be used by the end user to and to access the associated information. FIG. 9 illustrates some examples of interactive markers.

At 860, sensory content production system 245 generates sensory content configured for sensory presentation to users. The sensory content supports a user's comprehension of the foundation document by enabling sensory engagement by the user with one or more concepts identified in the foundation document. The sensory content production system 245 generates sensory content for identified concepts 295 in a foundation document and stores this content as sensory content records 296 in sensory content database 250. In some embodiments, sensory content production system 245 also generates sensory content for concept definitions 280 and stores this content as sensory content records 297 in sensory content database 250.

Accordingly, sensory content database 250 may store a plurality of sensory content records 296 for concepts. Each sensory content record 296 includes: an interactive marker 255 that indicates the presence of a concept and availability of associated sensory content; concept identifier 275 that identifies the associated concept 295; transformed concept 278; a sensory composition 260 in a first sensory type for the concept; and rendering properties 267. Transformed concept 278 refers to a transformation of the concept identifier (e.g., name) into sensory content.

In some embodiments, transformed concept 278 refers to a transformation of the concept identifier (e.g., name) into the same sensory content class as the composition 260. As an example, if the sensory type of composition 260 is western classical musical hearing type, then the corresponding transformed concept 278 is in a hearing type, such as human voice, text to speech, etc. In some embodiments, a plurality of types may be available for the type of the transformed concept 278*a*, but one is selected based on default, or user input, etc.

In other embodiments, transformed concept 278 refers to a transformation of the concept identifier (e.g., name) into a different sensory content class from the composition 260. As an example, if the sensory type of composition 260 is western classical musical hearing type, and the corresponding transformed concept 278 is in Braille for a blind user. It is noted that a plurality of classes and types may be available and possible for the type of the transformed concept 278, but some may not. For example, if the intended user is blind, it may not make sense to have the transformed concept 278 be of a sight type.

Rendering properties 267 may include one or more of: (i) a time interval needed to render composition 260, (ii) a time interval needed to render transformed concept 278, (iii) area needed to render composition 260, such as area needed on a display device, area needed on a printout, (iv) area needed to render transformed concept 278, such as area needed on a display device, area needed on a printout, (v) memory or processing power needed to render composition 260, (vi) memory or processing power needed to render transformed concept 278, and so on.

For a given concept 295, there may be a plurality of sensory content records of different classes and types. As illustrated in FIG. 2, for a particular concept associated with a given concept identifier 275, there are two sensory content records 296*a* and 296*b*. In some embodiments the two sensory content records 296*a* and 296*b* contain sensory compositions of different types or classes. E.g., sensory content records 296*a* might contain western classical music composition, and sensory content records 296*b* might contain a Braille composition, both for the same concept, e.g., "gravity".

For a given concept definition 280, there may be a plurality of sensory content records of different classes and types. As illustrated in FIG. 2, for a particular concept definition 280 associated with a given concept identifier 275, there are two sensory content records 297*a* and 297*b*, each containing sensory compositions of different types or classes. E.g., sensory content records 297*a* might contain western classical music composition, and sensory content records 297*b* might contain a Braille composition, both for the same concept definition, e.g., the concept definition for the concept "gravity".

Accordingly, sensory content database 250 may store a plurality of sensory content records 297 for concept definitions. Each sensory content record 297 includes: interactive marker 255 that indicates the presence of sensory content; concept identifier 275 that identifies the associated concept 295; transformed concept definition 288; a sensory composition 261 in a first interactive marker type for the concept definition; and rendering properties 267. Analogous to the transformed concept 278, transformed concept definition 288 refers to a transformation of the concept definition 280 into sensory content.

Rendering properties 268 may include one or more of: (i) a time interval needed to render composition 261, (ii) a time interval needed to render transformed concept definition 288, (iii) space (e.g., space on a display, soft copy or hard copy) needed to render composition 261, (iv) space (e.g., space on a display, soft copy or hard copy) needed to render transformed concept definition 288, (v) memory or processing power needed to render composition 261, (vi) memory or processing power needed to render transformed concept definition 288, and so on. [0075] Concept identifier 275 is used to retrieve the associated concept record and the location information 285 identifying the location where the interactive marker 255 would be inserted in order to indicate the presence of sensory content associated. For example, for a concept "gravity" appearing on page 2, line 1 of "Astronomy 101" textbook, an interactive marker 255*a* indicates availability of sensory content and points to the sensory composition 260*a*, and interactive marker 255*b* indicates availability of sensory content and points to the sensory composition 260*b*. Sensory content production system 250 is discussed further with reference to FIG. 6.

The computation and search engine 230 performs analysis of end users' activities, and updates content database 125 based on those activities, including updating supplemental content. The computation and search engine 230 also enables search of the content database 125, including enabling search of the learning activities stored therein. Data rendering module 290 enables presentation and visualization of learning services 220 to a user.

A multilayered document 300 includes several layers, where a layer is a data structure that stores specific content (e.g., user-generated notes are stored in user generated content layer 315), and interactive markers indicating the presence and/or availability of the specific content within the layer. The interactive markers index the content in a layer and facilitate rendering of the content in the layer, as well as operations such as content searching, querying of content, linking of content, navigation of content, etc. The interactive markers for one or more of the layers 315-340 are embedded, overlaid, inserted, or made otherwise made available into a foundation document layer 310, so that a user accessing the foundation document may be notified as to the presence or availability of the content to which the markers point. As an example, a concept layer 320 includes a set of mapped concepts as well as a corresponding set of interactive markers, where a respective interactive marker indicates the presence of a corresponding concept. Accordingly, markers for concept layer 320 are embedded, overlaid, inserted, or made otherwise made available into a foundation document layer 310, so that a user accessing the foundation document may be notified as to the presence or availability of the concepts to which the markers point. The markers are interactive, such that a user may interact with a marker (e.g., by clicking, selecting, etc.) to access the content to which the marker points.

Document 300 includes a foundation document layer 310 made of reconstructed HTML pages, and one or more other layers, such as: a user-generated content layer 315 (e.g., containing notes, highlights, etc.), a learning activities layer 318 (e.g., containing Q&A), a concept layer 320 containing names of mapped concepts 295, a concept definition layer 330 containing concept definitions 280, one or more sensory layers 340, and an aggregate marker layer 350 containing an aggregation of all markers in the layers 315-340. Each sensory layer 340 corresponds to a particular sensory type (e.g., western classical music type, Braille) and includes both sensory content (such as, sensory content 260 and 261) and the associated interactive marker 255. The aggregate layer 350 contains all markers corresponding to the totality of the non-foundation content per page and can be used by the user to navigate to that non-foundation content. There may be additional layers (not shown in FIG. 3), such as additional user-generated content layers (e.g., each generated by different users), additional sensory layers, foreign language layers that present content in the document layer in other languages, social network layers that present content generated in the course a user's activity in a social network, an advertising layer that presents advertising content, and so on.

The user may wish to consume the aggregate layer 350 individually in order to identify and/or to navigate to all non-foundation content in layers 315-340 for one or more pages or even the entire document. For e.g., the user may wish to identify and navigate to certain pages of the document, such as, pages with the most non-foundation content. The layering model is useful as it enables user operations, such as search, play, etc. For example, a user may be able to search for and navigate to pages with the greatest number of concepts, pages with specific concepts, pages with most user-generated content, pages with specific user-generated content, and so on.

Figure 3:
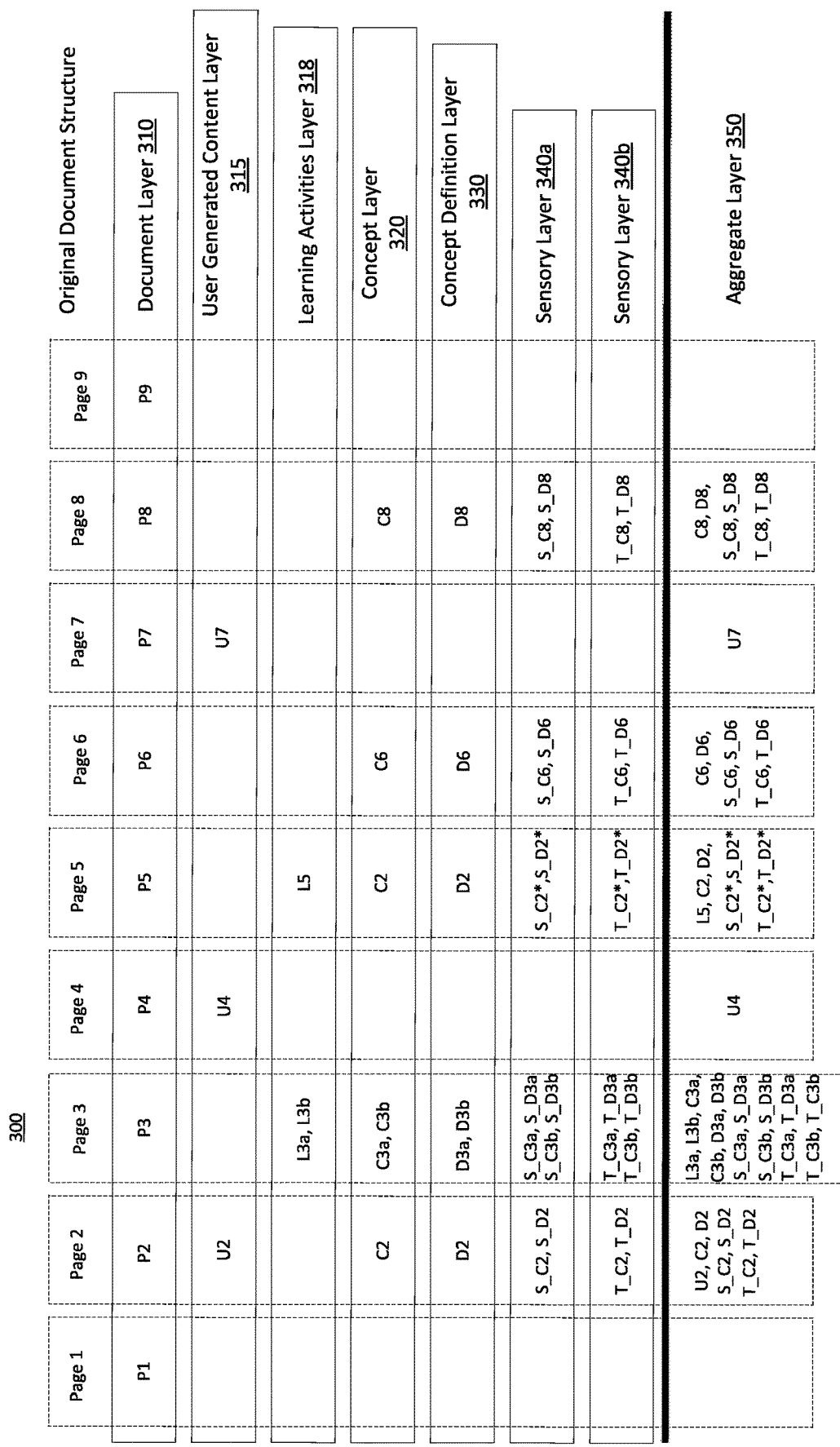
FIG. 3 illustrates layers of a multilayered document, according to one embodiment.

As illustrated in FIG. 3, page 1 only contains content P1 in its document layer. In contrast, page 2 of the document corresponds content P2 in its document layer, user-generated content pointed to by marker U2 in layer 315, concept pointed to by marker C2 in the concept layer 320, concept definition pointed to by marker D2 in concept definition layer 330, sensory content pointed to by marker S2 in sensory layer 340a, and sensory content pointed to by marker T2 in sensory layer 340b. This means that the concept extraction module 240 has identified that the concept pointed to by marker C2 occurs in page 2 of the document. In contrast, there are no concepts mapped to page 1 of the document, and accordingly, there are no interactive markers and specific content in layers 320 and 330 for page 1. The concept pointed to by interactive marker C2 is further associated with the concept definition pointed to by marker D2. This means that the concept definition system 242 has identified that the concept pointed to by interactive marker C2 is associated with the concept definition pointed to by interactive marker D2. The concept pointed to by marker C2 is associated with sensory composition pointed to by interactive marker S_C2 of a first type (e.g., western classical) and sensory composition pointed to by interactive marker T_C2 of a second type (e.g., Braille). Concept definition D2 is associated with sensory composition pointed to by interactive marker S_D2 of a first type (e.g., western classical) and sensory composition T_D2 pointed to by interactive marker of a second type (e.g., Braille). This means that the sensory content production module 245 has generated sensory compositions pointed to by interactive markers S_C2 and T_C2 for concept C2 and sensory compositions pointed to by interactive markers S_D2 and T_D2 for concept definition D2.

Page 3 of the foundation document has two mapped concepts pointed to by interactive markers C3a and C3b, where C3a precedes C3b in an order of appearance on the page. Accordingly, (i) values for sensory compositions (pointed to by markers S_C3a and T_C3a) for concept pointed to by marker C3a, (ii) values for sensory compositions (pointed to by markers S_D3a, and T_D3a) for associated concept definition pointed to by marker D3a, (iii) values for sensory compositions (pointed to by markers S_C3b and T_C3b) for concept pointed to by marker C3b and (iv) values for sensory compositions (pointed to by markers S_D3b, and T_D3b) for associated concept definition pointed to by marker D3b are computed by the sensory content production module 245 to reflect the order of appearance into account.

Concepts can occur on more than one page in the document. As illustrated, concept pointed to by marker C2 and corresponding concept definition pointed to by marker D2 occur on both pages 2 and 5 of document 300. Sensory layers 340a and 340b contain sensory content pointed to by markers S_C2*, S_D2*, T_C2*, and T_D2*, which is the sensory content as pointed to by markers S_C2, S_D2, T_C2, and T_D2. The markers themselves are different (S_C2 versus S_C2*, S_D2 versus S_D2*, and so on), because markers in each pair points to different locations (page 2 versus page 5).

The multilayered document 300 contains a plurality of layers, and one or more of the plurality of layers may be available for consumption individually or in any combination, e.g., based on business rules, licensing requirements, payment of fees, and digital rights management. Accordingly, each layer maybe individually available for consumption, sharing, transfer, purchasing, and selling, and two or more layers may be consumed, shared, transferred, purchased, or sold together. Individual layers may also be consumed concurrently, but on different devices. E.g., content of the document layer 310 may be rendered on a laptop, while a sensory content in sensory layer 330 is concurrently rendered on a connected speaker.

FIG. 4 illustrates an alternate multilayered document 400. Multilayered document 400 is similar to multilayered document 300 illustrated in FIG. 3, except that instead of one sensory layer 340 that includes sensory content for both the concepts and the respective concept definitions, there exist two sensory layers 440 and 445, where the former includes sensory content for the concepts and the latter includes sensory content for the concept definitions. As an example, for given concepts C2, C3a, C3b, C6 and C8 with corresponding concept definitions D2, D3a, D3b, D6, and D8, sensory layer 440a includes sensory content of a first type for the concepts, sensory layer 445a includes sensory content of the first type for the concept definitions, sensory layer 440b includes sensory content of a second type for the concepts, and sensory layer 445b includes sensory content of the second type for the concept definitions. One consequence of having two sensory layers 440 and 445 instead of a single layer 340 is that it enables consumption of sensory content for the concepts separately from the sensory content of the associated concept definitions.

Figure 5:
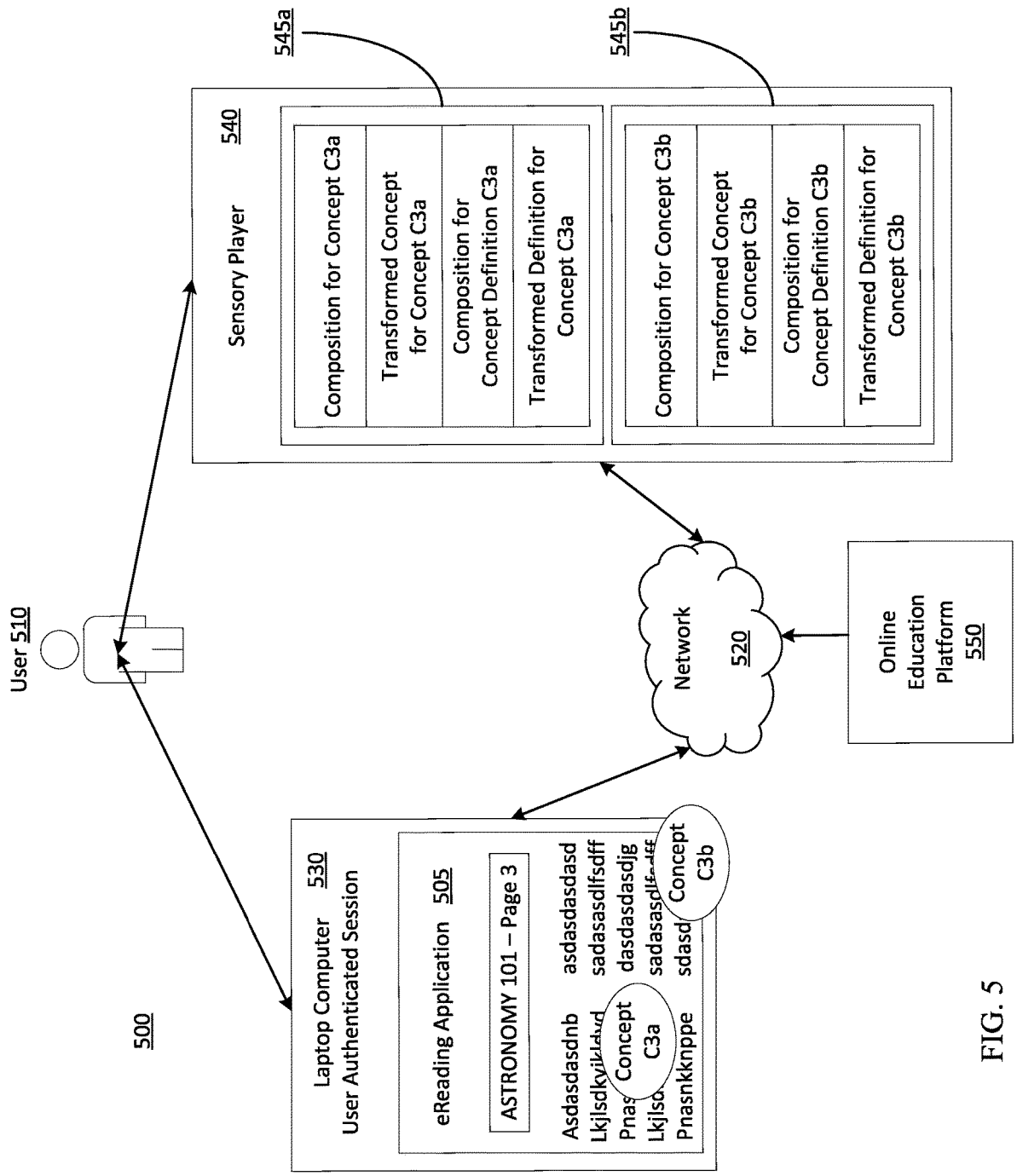
FIG. 5 is a high-level block diagram of a networked environment that can be used by a user to render sensory content according to one embodiment

FIG. 5 illustrates an eReading environment 500 including an online educational digital publication and reading platform 550 and a user device 530. Online education platform 550 is similar to platform 110 in FIG. 1 and provides multilayered documents, such as multilayered document 300, for consumption by users, user 510.

Online education platform 550 delivers multilayered content to an eReading application 505 executing on the user device 530 through the network 520, where at least one of the layers of the multilayered content is sensory content. In some embodiments, the eReading application 505 fetches content from the platform 550 in small increments, such as one page at a time. Alternatively, the user device 530 may cache one or more pages, sections, etc. of the document to enable faster retrieval of the pages.

In some embodiments, the platform 550 of the present invention may allow the user to access content without downloading a specific reading application from the publisher. Rather, the eReading application 505 constructs document pages using structureless HTML5 elements. It should be noted that eReading application 505 comprise eReading applications as well as supplemental content applications that function in the browser environment to support the user's eReading activities and overall engagement with the multilayered documents distributed by the platform, such as notepad applications, social applications, and advertising applications. In one embodiment, the eReading application 505 integrates a number of a user's reading activities, including reading the content, navigating between pages, creating highlights, interacting with advertisements, generating social content, taking notes in relation to the content of the document, and searching the document by the user.

One user device 530 is illustrated in FIG. 5, but any number of user devices 530 may communicate with platform 550 to access the content distributed by platform 550. In one embodiment, a user 510 is associated with a corresponding user account on the platform 550, and content purchased by the user through the platform 550 is made available through the user account. The user device 530 may also be registered to the user account to authorize the device for accessing content. Examples of user devices 530 include: a desktop computer, a laptop, a smart phone, a tablet, an eReader, an Internet television, or any other device that has computing functionality and data communication capabilities.

In some cases, user device 530 may be capable of and is used for rendering sensory content. For example, a smart phone can be used to render hearing sensor marker types, such as, bells, animal sounds, bird sounds, nature sounds, ring tones, instrumental music, vocal music, cartoon voices, human voices, and other sounds. As another example, the smart phone can also be used to render sight sensor marker types, such as, animations, pictures, videos, emoticons, cartoons, etc. In addition or in the alternative, one or more sensory players 540 may be used to render sensory content. For example, a sensory player 540 may include a connected braille typewriter to render braille sensory content. As another example, a sensory player 500 may include a connected scent diffuser to distribute scents, such as nature scents, food scents, essential oils, perfumes, etc. As another example, a sensory player 540 may include a connected speaker to render hearing sensor marker types, such as, bells, animal sounds, bird sounds, nature sounds, ring tones, instrumental music, vocal music, cartoon voices, human voices, and other sounds.

In some embodiments, a user can concurrently read a foundation document in an eReading application 505 executing on user device 530 while rendering sensory content via a suitable player (whether user device 530 or sensory player 540). As illustrated, user 510 is using a laptop computer to access page 3 of Astronomy 101 textbook. Concurrently, user 510 is using sensory player 540 to render sensory content, such as corresponding to sensory layer 540*a* of the multilayered document corresponding to the textbook. For example, a user can view Page 3 on a laptop, while playing a music track corresponding to the sensory content mapped to Page 3 either via a built-in speaker of the laptop or via a connected speaker.

As illustrated in FIG. 5, page 3 of the Astronomy 101 textbook has two concepts pointed to by markers C3*a* and C3*b* mapped to it. Referring back to FIG. 3, concept layer 320 for page 3 includes the concepts pointed to by interactive markers C3*a* and C3*b*. In some embodiments, as a concept is encountered, sensory player 540 (as illustrated) renders the following set of information from the sensory content layer (say layer 340*a*) being rendered: transformed concept identifier 278, composition 260*a* for the concept, transformed concept definition 288, and composition 261 for the concept definition 280.

A sequence of rendering of this content may be different in different embodiments. In some embodiments, a sequence of rendering is: transformed concept identifier 278, composition 260*a* for the concept, transformed concept definition 288, and composition 261 for the concept definition 280. In other embodiments, a sequence of rendering is: composition 260*a* for the concept, transformed concept identifier 278, composition 261 for the concept definition 280, and transformed concept definition 288.

As illustrated in FIG. 5, for two concepts C3*a* and C3*b* occurring on page 3 in that order, sensory player 540 renders sensory content 545*a* corresponding to concept C3*a* followed by sensory content 545*a* corresponding to concept C3*b*. This follows a natural progression of occurrence of the concept in the document, as concept C3*b* occurs after, in terms of spatial location, the concept C3*a* in page 3 of the document—Astronomy 101.

Accordingly, sensory player 540 renders (in any of the two sequences of rendering mentioned above) sensory content 545*a* corresponding to concept C3*a*: transformed concept identifier for concept C3*a*, composition pointed to by marker S_C3*a* for the concept C3*a*, transformed concept definition for concept definition D3*a* (where concept definition D3*a* is the concept definition for concept C3*a*), and composition pointed to by marker S_D3*a* for the concept definition pointed to by marker D_3*a*. Sensory player 540 next renders (in any of the two sequences of rendering mentioned above) sensory content 545*b* corresponding to concept C3*b*: transformed concept identifier for concept C3*b*, composition pointed to by marker S_C3*b* for the concept C3*b* (where concept definition D3*b* is the concept definition for concept C3*b*), transformed concept definition for concept definition pointed to by marker D3*b*, and composition pointed to by marker S_D3*b* for the concept definition D3*b*.

As an example, say concept C3*a* has the following values in its concept record 295: concept identifier 275=gravity; concept definition 280=force of attraction between two bodies; and location 285=page 3 of Astronomy 101, page 5 of Astronomy 101, etc. Accordingly, as illustrated in FIG. 5, a sequence of rendering by sensory player 440 is: sensory composition for gravity in the appropriate sensory class (e.g., western classical music), concept name "gravity" transformed into the appropriate sensory class (e.g., hearing), sensory composition for force of attraction between two bodies in the appropriate sensory class (e.g., western classical music), and concept definition "force of attraction between two bodies" transformed into the appropriate sensory class (e.g., hearing).

In some embodiments, as discussed above, the sensory type of the composition 260*a* and composition 260*b* is a first type, while sensory type of the transformed concept identifier 278 and transformed concept definition 288 is a second type, although both types are of the same class. For example, composition 260*a* and composition 260*b* may be a C major ascending classical composition, while transformed concept identifier 278 and transformed concept definition 288 are rendered in text to speech, such that all four are hearing type sensory content. An example is provided further with reference to FIG. 10B.

In other embodiments, as discussed above, the sensory type of the composition 260*a* and composition 260*b* is a first type, while sensory type of the transformed concept identifier 278 and transformed concept definition 288 is a second type, where the two types belong to two different sensory classes. For example, composition 260*a* and composition 260*b* may be a C major ascending classical composition, thus belonging to the hearing class, while transformed concept identifier 278 and transformed concept definition 288 are rendered in Braille, and thus belong to the tactile sensory class. Other combinations and permutations of classes and types may be possible and desirable depending on the needs of the end users and the capabilities of user devices 530 and 540.

Communication between the platform 550 and user devices 530 and 540 is enabled by network 520. In one embodiment, the network 520 uses standard communications technologies and/or protocols. Thus, the network 520 can include links using technologies such as Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, etc. Similarly, the networking protocols used on the network 325 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 520 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, network 520 can also include links to other networks such as the Internet.

As illustrated in FIG. 5, the sensory player 540 is also in communication with network 520, but in other embodiments, the sensory player 540 may instead be in communication and/or paired with user device 530, e.g., via a personal area network such as, a Bluetooth connection.

Figure 6:
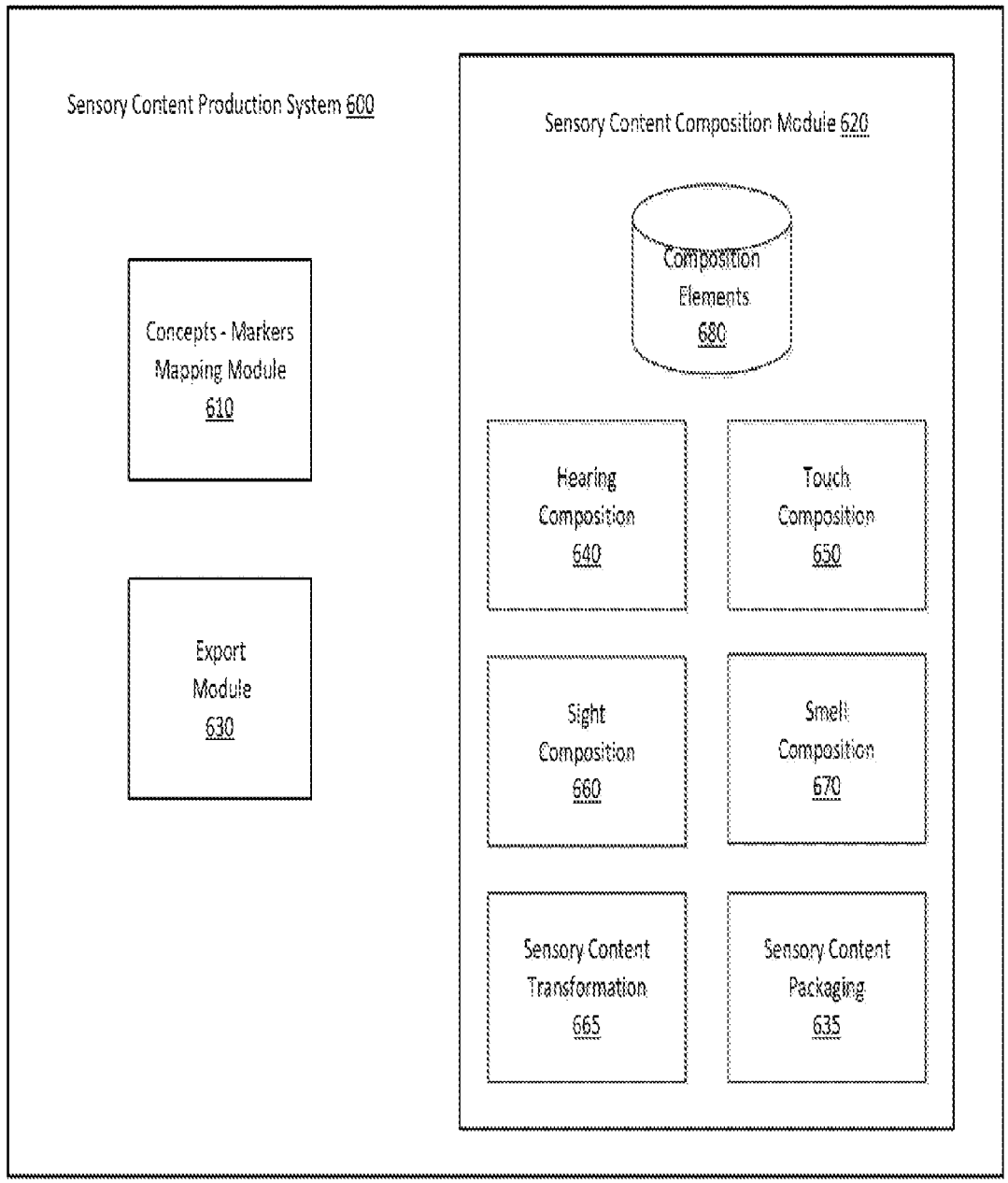
FIG. 6 is a block diagram illustrating modules within the sensory content production system, according to one embodiment.
Figure 7:
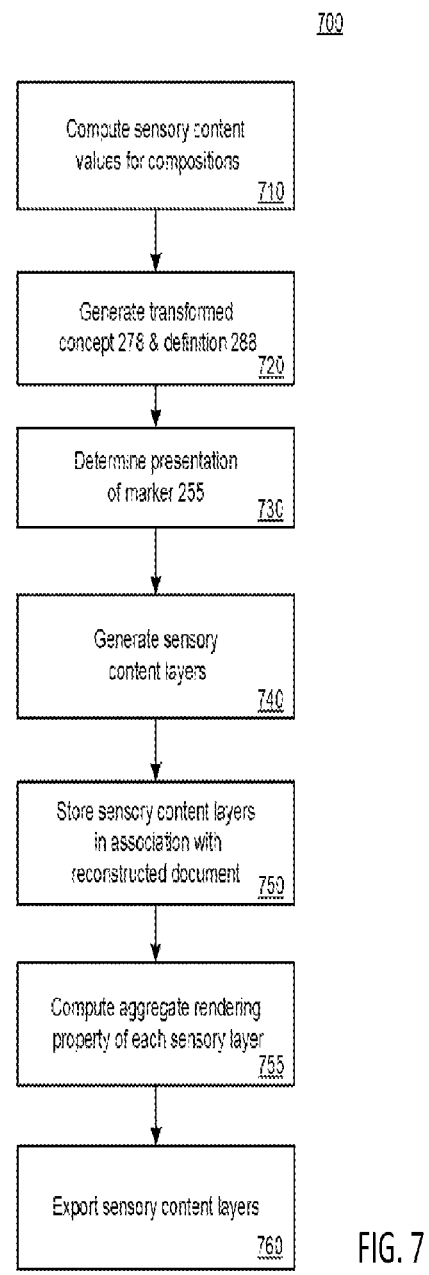
FIG. 7 is a flowchart illustrating a method for generating sensory content associated with concepts in an electronic document, according to one embodiment.

FIG. 6 illustrates a block diagram of the sensory content production system 245 according to some embodiments. FIG. 7 illustrates a flowchart 700 of the corresponding method according to some embodiments.

Sensory content production system 600 includes the following modules: concept to marker mapping module 610, composition module 620, and export module 630. Other embodiments of the interactive marker production system 600 include fewer or more modules, and distribute the functionalities among the modules in a different manner. In some embodiments, an output of the sensory content production system 600 are the records 296 and 297 stored in sensory content database 250 (illustrated in FIG. 2).

Composition elements database 680 provides the raw material for sensory content generation. Accordingly, composition elements database 680 may include a repository of sounds, such as, bells, animal sounds, bird sounds, nature sounds, ring tones, instrumental music, vocal music, cartoon voices, human voices, and other sounds, that may be used to generate sensory content of hearing type. As another example, composition elements database 680 may include a repository of images, pictures, videos, animations, emoticons, cartoons, etc. that may be used to generate sensory content of a visual type. As another example, composition elements database 680 may include a repository of braille alphabet and other tactile data that may be used to generate sensory content of a touch type. As another example, composition elements database 680 may include a repository of nature scents, food scents, perfumes, and other smells that may be used to generate sensory content of a smell type.

Hearing composition module 640 includes a repository of rules that apply to each hearing sensory content type. For example, rules maintained by hearing composition module 640 may include the properties of hearing type sensory content, such as, tempo, pitch, type of instrument, and key signature. Hearing composition module 640 provides the values for these properties when generating hearing sensory content.

Touch composition module 650 includes a repository of rules that apply to each touch sensory content type. For example, rules maintained by touch composition module 750 may include the properties of different touch type sensory content, such as size of grid, pressure, etc. Touch composition module 650 provides the values for these properties when generating touch sensory content.

Sight composition module 660 includes a repository of rules that apply to each visual sensory content type. For example, rules maintained by sight composition module 660 may include the properties of visual type sensory content, such as, brightness, color, sharpness, etc.

Sight composition module 760 provides the values for these properties when generating visual sensory content.

Smell composition module 670 includes a repository of rules that apply to each smell sensory content type. For example, rules maintained by smell composition module 770 may include the properties of smell type sensory content, such as, amount of sweetness, fragrance, fruitiness, pungency, smokiness, sharpness, etc. Smell composition module 670 provides the values for these properties when generating smell sensory content.

At block 710, composition module 620 receives sensory inputs from composition elements database 680 to generate sensory compositions 260 and 265. In some embodiments, composition module 620 generates sensory compositions of a plurality of pre-selected default types. In other embodiments, a user, such as an author, publisher, consumer, etc., may select the sensory content types.

In some embodiments, composition module 620 generates sensory compositions one or more interactive marker classes: hearing interactive marker class, smell interactive marker class, touch interactive marker class, and sight interactive marker class. In some embodiments, composition module 620 generates sensory compositions of all classes and/or of all types within all classes, and various suitable combinations by default. In some embodiments, a first set of sensory compositions are created by default, while others are created in a manner personalized for individual users (e.g., a particular student, a particular class, a particular school, etc.). In some embodiments, the determination of the default classes and/or the default types of interactive markers to generate may be based on a user profile of a registered user. For example, if the user profile of a registered user or class or school indicates that they are blind, then touch sensor markers may be generated, while sight sensor markers are not. In another embodiment, the determination of default and/or personalized classes and/or interactive markers types to generate may be based on user input or request. For example, a user may specify which type of voice he or she wishes to hear, such as animal, male, female, cartoon, etc. In some embodiments, one or more attributes of an interactive marker type are user-selectable. For example, a user may specify that timbre attribute is one of bell, drum, bass, etc.

In some embodiments, sensory compositions for related concepts may also be related. For example, western classical music hearing sensor markers for very related concepts may only differ in the values of a single attribute of the interactive marker, such as for pitch.

In some embodiments, composition module 620 computes and provides values for each attribute based on the respective order of appearance of the concepts in the document. For example, if three concepts appear in sequence on a particular page (or section, chapter, etc.), the values of the attributes of the sensory compositions may reflect the order. An example is provided with reference to FIG. 10B, in which an ascending scale is used for sequential concepts, whereby a concept would have a higher note than a concept that precedes it, but a lower note than a concept that succeeds it. Further, in some embodiments, composition module 620 takes into account one or more resource constraints, such as limitations on storage space, processor speed, time needed to render the interactive markers, etc. when determining the values, and thereby, the sensory compositions.

At block 720, sensory content analysis and transformation module 665 ingests concept identifier information 275, processes it, and outputs transformed concept 278. Sensory content analysis and transformation module 665 also ingests concept definition 280, processes it, and outputs transformed definition 288.

Blocks 710 and 720 may be repeated multiple times to create a plurality of different types of sensory content.

At block 730, optionally, concept to marker mapping module 610 determines how interactive markers 255 are presented within pages of a document. Presentation of the interactive markers 255 may include selection of color, shape, font, effect, etc. For example, interactive markers 255 may be presented by highlighting or otherwise differentiating text, e.g., by color.

In some embodiments, presentation of the interactive markers 255 is influenced by the sensory type of the sensory content to which the interactive marker 255 points. For example, given sensory layers (e.g., layers 340a and 340b) of two different types or classes of sensory content, concept to marker mapping module 610 determines how to indicate to user 510 that there are indeed two different types or classes of sensory content available and how to differentiate the presentation. For example, concept to marker mapping module 610 may present markers associated with sensory layer 340a in one color, shape, font, or effect and markers associated with sensory layer 340b in a different color, shape, font, or effect.

At 740, sensory content packaging module 635 provides sensory content for sensory layers, such as sensory layers 340, 440, and 445. In some embodiments, an output of sensory content packaging module 635 is series of blocks of information, where one block has the following possibilities for order of information: (1) transformed concept identifier 278, composition 260, transformed concept definition 288, and composition 261, and (2) composition 260, transformed concept identifier 278, composition 261, and transformed concept definition 288. As an example, referring back to FIG. 5, appropriate user device such as user device 530 or sensory player 540 renders the following blocks of information in sequence: block 545a including sensory content corresponding to concept C3a followed by block 545b including sensory content corresponding to concept C3b. Each block 545 includes the following four content pieces: a sensory composition for the associated concept, the transformed concept, a sensory composition for the associated concept definition, and the transformed concept definition.

In some embodiments, the various sensory layers contain content of different sensory type or classes from each other. In some embodiments, a single sensory layer contains sensory content of a single sensory type, such that the sensory type of the composition 260a, composition 260b, transformed concept identifier 278 and transformed concept definition 288 are identical.

In other embodiments, a single sensory layer may contain sensory content of two different types, such that the sensory type of the composition 260a and composition 260b is a first type, while sensory type of the transformed concept identifier 278 and transformed concept definition 288 is a second type. In other embodiments, a single sensory layer may contain sensory content of two different class, such that the sensory type of the composition 260a and composition 260b belong to a first sensory class, while sensory type of the transformed concept identifier 278 and transformed concept definition 288 belongs to a second sensory class. Other combinations and permutations of classes and types may be possible and desirable depending on the needs of the end users and the capabilities of user devices 530 and 540.

At block 750, sensory content packaging module 635 stores the sensory layers, such as sensory layers 340, 440, and 445, in association with reconstructed document, such as document layer 310. In some embodiments, sensory content packaging module 635 configures the transformed concepts 278, transformed concept definitions 288, and interactive markers 255 for presentation to users through eReading applications 505. In one embodiment, the delivery module 515 comprises a web application framework that retrieves concepts 530 and supplemental concept content 540 from the concept database 525 and generates markup language elements for delivery to client device 310 and/or 330. For example, the delivery module 515 may map each data field in the concept database 525 to a unique HTML document region. The markup language document generated by the delivery module 515 is referred to herein as a "concept listing document," but each region may be independently delivered to and reconstructed by the eReading browser applications 170. The regions may support content in a variety of formats, such as text, links, bitmaps, or multimedia. Moreover, each region may inherit the metadata associated with the corresponding term.

At block 755, sensory content packaging module 635 computes an aggregate rendering property of each sensory content layer. For hearing type sensory content, the aggregate rendering property may be an aggregate runtime of all sensory content for all the concepts in the electronic document. For Braille type sensory content, the aggregate rendering property may be an aggregate file size of all sensory content for all the concepts in the electronic document.

At block 760, export module 630 enables sensory content layers to be interpreted by suitable players, such as user device 530 and/or sensory player 540. Accordingly, export module 630 also enables standardization (e.g., encoding) of the sensory layers so that they may be suitable for interpretation, decoding, and rendering. As an example, export module 630 may enable hearing type sensory content to be standardized, such as, into a way file, so that it may be rendered by any number of audio playback devices, included connected speakers.

In some embodiments, the export module 630 converts the individual sensory layers 340 to a form that can be exported in standard publishing forms to be used e.g., in musical sheet notation, multimedia files, voice assistant applications, and so on. Accordingly, the content of the sensory layers is formatted to a generic form, so that it can be interpreted and rendered by suitable players. For example, western classical interactive marker layer may be exported to musical sheet notation, which can be used by a human musician for reading and playback. As another example, western classical interactive marker layer may be exported to a .wav or similar file (such as, a music track), which can be streamed and played back by a digital music player. As another example, braille interactive marker layer may be exported to braille notation, which can be used by a human for tactile interaction.

In this way, a user can learn about the concepts even when reading the foundation document. Instead of reading the document, the user can simply listen to the music track corresponding to the interactive markers and reinforce learning of the concepts in the document.

The sensory content production system 600 supports a user's comprehension of a foundation document. For example, the user can access sensory content for concepts appearing on the page without leaving the current page.

Users access foundation documents distributed by the publishing platform 305 through eReading browser applications 170 executing on their devices 310. As a user reads a foundation document, the user may wish to access the concepts associated with the document, for example, to read a definition of a concept, access other information about the concept, or find other pages on which the term appears. FIG. 9 illustrates example user interfaces and systems by which users may access concepts and associated interactive markers.

An example user interface 900 for displaying concepts and rendering sensory content to users is illustrated in FIG. 9. FIG. 9 illustrates a screen shot of an electronic document Astronomy 101 containing multiple pages-document page (N) 915 is being currently displayed to a user, is preceded by page (N−1) 910 and followed by page (N+1) 920. As illustrated, page (N) 915 contains two concepts C3a and C3b. As the user navigates through the foundation document, the learning services system 220 synchronizes the user's reading activities with available concepts and associated sensory content.

Interactive markers 930 and 935 indicate the presence of concepts C3a and C3b respectively on page N 915, and also indicate availability of a sensory content for the respective concepts, where the interactive markers have been mapped into the electronic document and overlaid into it. In some embodiments, as a concept is encountered in the document, the sensory content pointed to by the corresponding interactive marker is automatically rendered. Rendering sensory content refers to rendering the transformed concept 278 and transformed definition 288. In other embodiments, as a concept is encountered in the document, the corresponding interactive marker indicates that sensory content is available for rendering, so that the user may select whether its rendered or not. Additionally or alternatively, the user may be able to interface with the electronic document to render all or a subset of sensory content associated with concepts in one or more other pages or sections of the document. For example, user may command a voice assisted speaker to "Play all Sensory Content in Chapter 1" (where Chapter 1 may include several pages), "Play all Sensory content in Page N", "Play all Sensory content", etc.

Referring back to FIG. 5, assume that a user is rendering the electronic document by accessing page N 915 on his or her user device, such as user device 530. As a concept (e.g., concept C3a) in page N 915 is reached, the user encounters interactive marker 930. If sensory content pointed to by interactive marker 930 is of the braille touch marker type, it is rendered by an appropriate sensory player 540, such as a, braille typewriter. The interactive marker 930 may be synchronized with the user's reading activities related to the page 915 or the foundation document. If the user were to navigate to page N+1, the interactive markers are updated to those corresponding to the concepts appearing on page N+1.

As illustrated in FIG. 9, when the user encounters Concept C3a, the associated sensory content 945 for the concept is rendered. The sensory content 945 includes transformed sensory content (such as content 278) for the concept C3a, composition for concept (such as composition 260), its transformed supplemental concept content (such as content 288), and composition for concept definition (such as composition 261). When the user moves on to Concept C3b, the sensory content 950 for the concept is rendered. The rendering of the sensory content 945 and 950 takes place using a suitable player, such as user device 530 and/or sensory player 540. When the user navigates to page (N+1) 920, interactive markers associated with the concepts located in page (N+1) 920 are presented to the user.

In some embodiments, it may be desirable to render sensory content 278 and 288 for concepts spatially located in a particular page all at once instead of one by one in order of appearance on the particular page. For example, if the reader is viewing a book on a laptop, in some embodiments, it may be desirable to render sensory content for concepts C3a and C3b all at once in a secondary tab 940, as illustrated in FIG. 9. This may be desirable for example, if the user wishes to read the document quickly and learn about all of the important concepts in a haste.

In a particular page, a concept may appear more than once. Say, e.g., concept C3a appears twice on page N 915. Accordingly, when presenting page N 915, the corresponding marker 930 may be presented twice to the user in association with the spatial location of the concept. However, in some embodiments, the sensory content 945 for concept C3a may only be rendered once to avoid repetition.

A concept may occur multiple times in a document. Say, e.g., concept C3a appears once on page N 915 and once on page N+1 920. Accordingly, in some embodiments, the corresponding marker 930 may be presented once to the user when viewing page N 915 and then again when viewing page N+1 920. It is noted that marker 930 points to the same sensory content as stored in record 296, and as such, with both pages 915 and 920, the same sensory content 945 would be rendered.

Figure 10A:
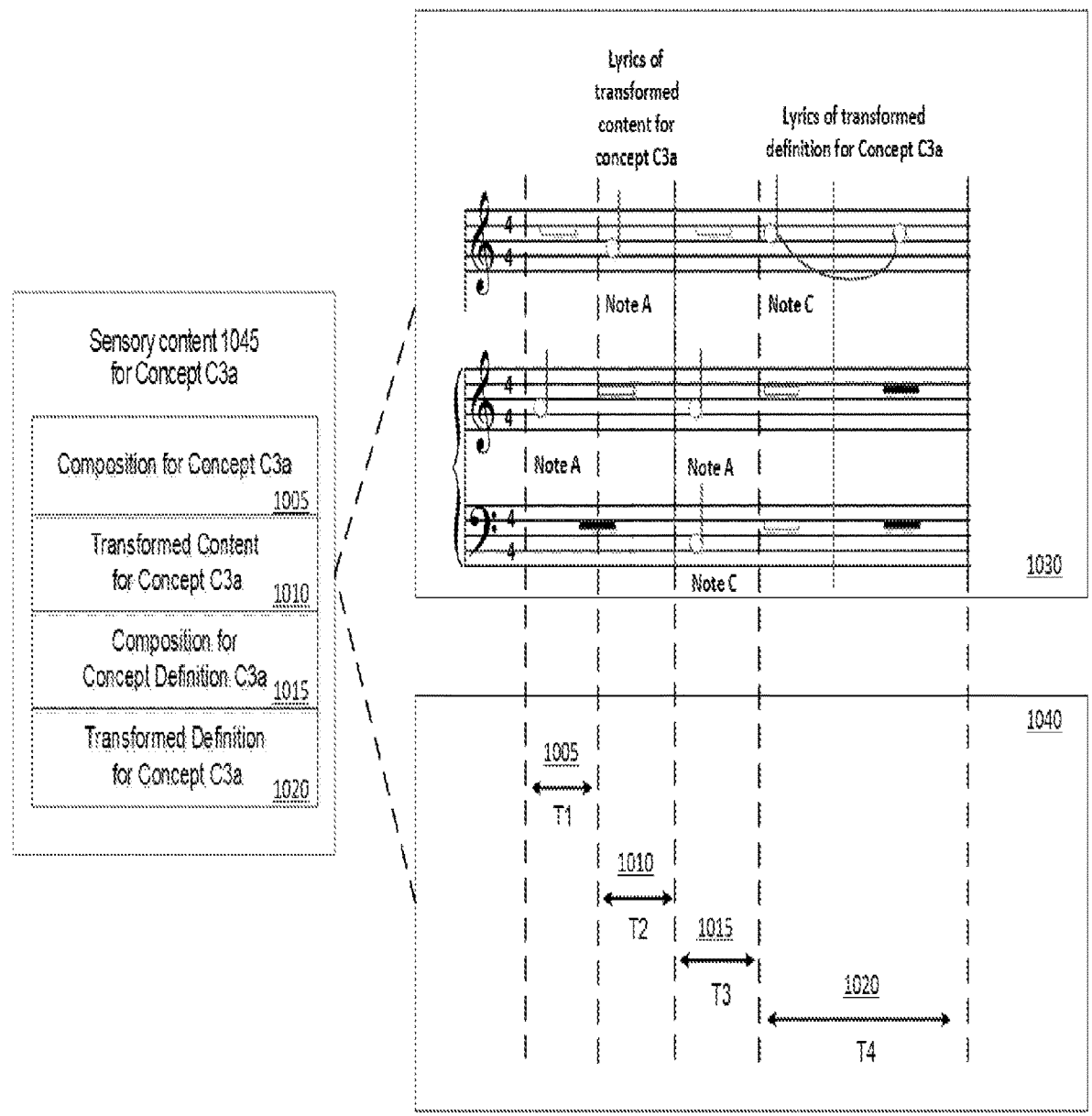

FIGS. 10A and 10B illustrates an example hearing type sensory content and how it may be rendered by a sensory player, such as a speaker. Specifically, the figures illustrate a western classical music rendering 1040 of the sensory content 1045 by a suitable player and the corresponding western classical musical notation 1030.

In one embodiment, the rendering sequence for sensory content for a concept is as follows: (1) sensory composition for the concept identifier, (2) the transformed concept—in this case, lyrics corresponding to concept identifier, (3) sensory composition for the concept definition, and (4) the transformed concept definition—lyrics corresponding to concept definition. As discussed earlier, in some embodiments, the rendering sequence may be different. For example, one alternate sequence is follows: (1) the transformed concept corresponding to concept identifier, (2) sensory composition for the concept identifier, (3) the transformed concept definition corresponding to concept definition, and (4) sensory composition for the concept definition.

The rendering 1040 illustrated in FIG. 10A contains four components rendered as follows: (1) composition 1005 in note A is rendered in playtime interval T1, (2) lyrics corresponding to transformed concept 1010 are rendered in playtime interval T2, where the pitch applied to rendering the lyrics is note A (3) composition 1015 in note C harmonic of note A is rendered in playtime interval T3, and (4) lyrics corresponding to transformed concept definition 1020 are rendered in playtime interval T4, where the pitch applied to rendering the lyrics is note C.

As illustrated, lyrics corresponding to transformed concept 1010 are in note A, which matches the note of the composition 1005. Matching the tone of the composition 1005 with the lyrics corresponding to transformed concept 1010 may create an aesthetically pleasing sound and may help the user retain the association between the two sounds 1005 and 1010. This may ultimately help the user retain information for concept better.

Further, as illustrated, lyrics corresponding to transformed concept definition 1020 are in note C, and the composition 1015 is a harmonic third of note A Harmonics tend to create pleasing sounds; it should be noted that other harmonics can be used. Matching the tone of the composition 1015 with the lyrics corresponding to transformed concept definition 1020 (with an octave difference) may create an aesthetically pleasing sound and may help the user retain the association between the two sounds 1015 and 1020. This may ultimately help the user retain information for concept definition better.

Accordingly, as illustrated, there is a musical relationship between the four components 1005, 1010, 1015, and 1020, which helps user associate concepts and concept definitions to particular sounds and ultimately help the users retain corresponding information.

Note that the time intervals T1, T2, T3, and T4 may not be identical. In some embodiments, the time intervals T1 and T2 are stored in properties 267 of concept record 296 and intervals T3 and T4 are stored in properties 268 of concept definition record 297, and may be used to arrange sequential rendering of the four components of the sequence illustrated in FIG. 10A by composition module 620. In some embodiments, there may be some gaps, overlap, fading, etc., between the four components, as may be specified by rules in hearing composition module 640.

In some embodiments, rendering of the sensory content for a concept may cause a pause in the rendering of the document. Once the sensory content for the concept has been rendered, the rendering of the document is resumed until the next concept is encountered and rendering of sensory content for this next concept is initiated. Rendering of the sensory content in this situation clearly adds time to the rendering time of the document.

For example, take a recorded online course, such as a MOOC, which may originally have a runtime of 60 minutes. A user consuming this MOOC may cause the MOOC to be paused and resumed several times, where during each of these pause intervals, sensory content for a concept is rendered. As a result, running time of the MOOC may increase significantly based on a number of concepts identified in the MOOC and running time of the sensory compositions and transformed content.

In some embodiments, if multiple concepts appear in sequence on a particular page (or section, chapter, etc.), the values of the attributes of their associated sensory compositions may reflect the order. An example is provided with reference to FIG. 10B, in which an ascending scale is used for sequential concepts, whereby a concept would have a higher note than a concept that precedes it, but a lower note than a concept that succeeds it.

FIG. 10B is similar to FIG. 10A, except that it illustrates sensory content 1095 for concept C3b, which in terms of spatial location, appears after concept C3a on a given page, such as page 3 of multi-layered document 300. Specifically, FIG. 10B illustrates a western classical music rendering 1070 of the sensory content 1095 for concept C3b by a suitable player and the corresponding western classical musical notation 1050.

The rendering 1070 illustrated in FIG. 10B contains four components of sensory content 1095 for concept C3b rendered as follows: (1) composition 1075 for concept C3b in note Bis rendered in playtime interval TS, (2) lyrics corresponding to transformed concept 1080 are rendered in playtime interval T6, where the pitch applied to rendering the lyrics is note B (3) composition 1085 in note D harmonic of note B is rendered in playtime interval T7, and (4) lyrics corresponding to transformed concept definition 1090 are rendered in playtime interval T8, where the pitch applied to rendering the lyrics is note D.

As illustrated, lyrics corresponding to transformed concept 1080 are in note B, which matches the note of the composition for concept C3b 1075. Note Bis a higher note than note A, which was the note for lyrics corresponding to transformed concept 1010 and composition for concept C3a 1005. Similarly, note D (lyrics of transformed definition of concept c3b) is a higher note than note C (note for lyrics corresponding to transformed definition of concept c3a). Accordingly, as illustrated, there is a musical relationship between the sensory content 1095 for concept C3b and the sensory content 1045 for concept C3a, which helps user retain corresponding information. In the example illustrated in FIG. 10B, the musical relationship is C major ascending order, but it is noted that other scales could be used.

Adopting such a musical relationship for successive concepts may help the user differentiate between successive concepts. This may ultimately help the user retain information for the concepts better.

Figure 11:
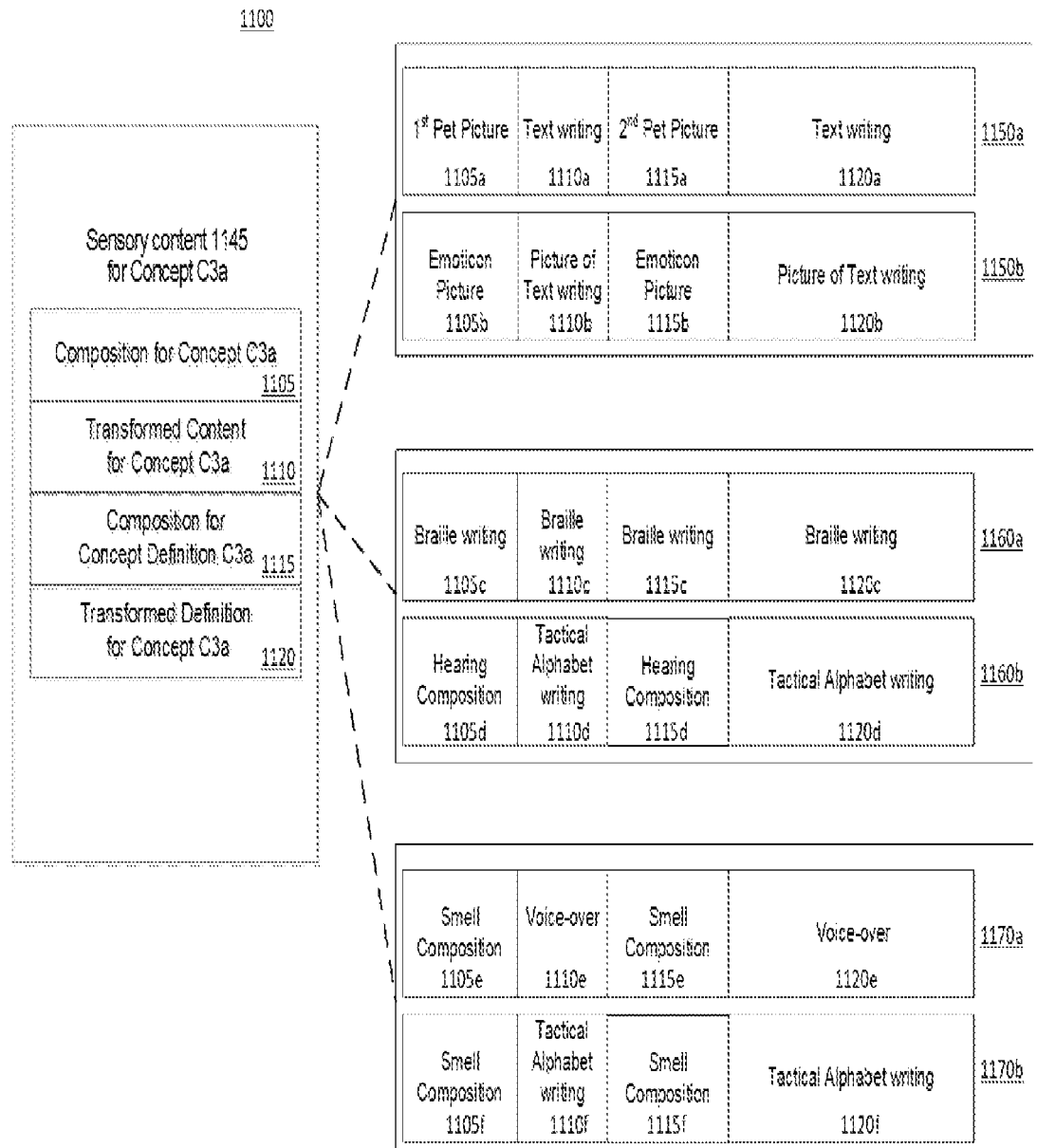
FIG. 11 illustrates examples of several types of sensory layer content types, according to one embodiment.

FIG. 11 illustrates some examples of other types of sensory content.

As discussed earlier, one possible rendering sequence for sensory content for a concept is as follows: (1) sensory composition 1105 for the concept identifier, (2) the transformed concept 1110, (3) sensory composition 1115 for the concept definition, and (4) the transformed concept definition 1120.

Accordingly, a first example sight sensory content 1150a may include: (1) a first pet picture 1105a as the sensory composition 1105 for the concept identifier, (2) a first text writing 1110a corresponding to the transformed concept identifier 1110, (3) a second pet picture 1115a as the sensory composition 1115 for the concept definition, and (4) a second text writing 1120a corresponding to the transformed concept definition 1120.

A second example sight sensory content 1150b may include: (1) a first emoticon image 1105b as the sensory composition 1105 for the concept identifier, (2) a first picture containing text writing 1110a corresponding to the transformed concept identifier 1110, (3) a second emoticon picture 1115b as the sensory composition 1115 for the concept definition, and (4) a second picture containing text writing 1120*a* corresponding to the transformed concept definition 1120.

Accordingly, a first example tactile sensory content 1160*a* may include: (1) a first set of Braille cells 1105*c* as the sensory composition 1105 for the concept identifier, (2) a second set of Braille cells 1110*c* corresponding to the transformed concept identifier 1110, (3) a third set of Braille cells 1115*c* as the sensory composition 1115 for the concept definition, and (4) a fourth set of Braille cells 1120*c* corresponding to the transformed concept definition 1120.

A second example tactile sensory content 1160*b* may include: (1) a first hearing composition 1105*d* as the sensory composition 1105 for the concept identifier, (2) a first set of tactile alphabet 1110*d* corresponding to the transformed concept identifier 1110, (3) a second hearing composition 1115*d* as the sensory composition 1115 for the concept definition, and (4) a second set of tactile alphabet 1120*d* corresponding to the transformed concept definition 1120.

Accordingly, a first example smell type sensory content 1170*a* may include: (1) a first smell composition 1105*e* as the sensory composition 1105 for the concept identifier, (2) a first voiceover 1110*e* corresponding to the transformed concept identifier 1110, (3) a second smell composition 1115*e* as the sensory composition 1115 for the concept definition, and (4) a second composition 1120*e* corresponding to the transformed concept definition 1120.

A second example smell type sensory content 1170*b* may include: (1) a first smell composition 1105*f* as the sensory composition 1105 for the concept identifier, (2) a first tactile alphabet writing 1110*f* corresponding to the transformed concept identifier 1110, (3) a second smell composition 1115*f* as the sensory composition 1115 for the concept definition, and (4) a second tactile alphabet writing 1120*f* corresponding to the transformed concept definition 1120.

As illustrated, 1160*a* contains sensory content of one sensory type, while 1160*b* contains sensory content of one sensory class (sight), but of two different types. Further, sensory content 1160*b*, 1170*a* and 1170*b* are hybrid sensory content blocks containing sensory content of different sensory classes. Other combinations of sensory content class and types are possible.

Figure 12:
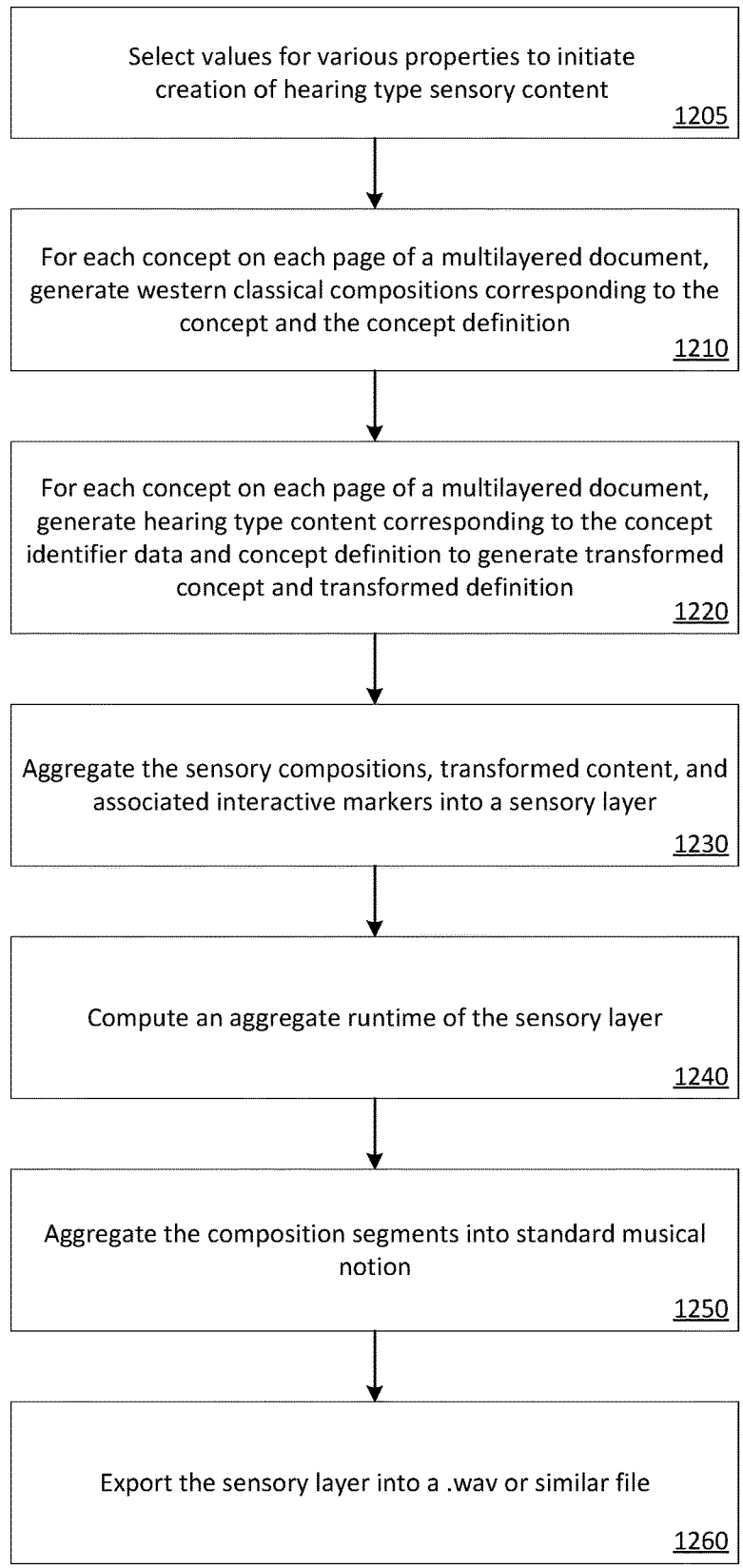
FIG. 12 is a flowchart illustrating a method for generating western classical sensory content, according to one embodiment.

FIG. 12 provides a flowchart for a method 1200 for generating western classical type sensory content.

At block 1205, hearing composition module 640 selects values for various properties 267 to initiate creation of hearing type sensory content. Properties for hearing type content may include mode, starting pitch, harmonics, tempo, sound type, voice type, and volume. Mode properties include scale, major or minor, ascending or descending, etc. The mode creates a framework of the type of composition and specifies an order of notes, i.e., what note comes next. Starting pitch specifies which note to start with. Harmonics specifies an association between the note for composition for a concept (such as, composition) 1005 and composition for a concept definition (such as, composition 1015). As an example, one set of corresponding values might be: scale C major ascending, note C, harmonic third, moderato, piano, soprano, medium. Tempo corresponds to time intervals for the sensory compositions, such as time intervals T1 and T3 illustrated in FIG. 10A, which in some embodiments might be different, but in some, are the same. For example, T1 and T3 could be the same length, such as, 1 second long each, or T3 could be twice as long as T1 across the sensory content layer for a document. Sound type specifies the instrument, whether a musical instrument, human, animal, robot, machine type, etc. Voice type depends on sound type. For example, for human voice has 5 types—soprano, mezzo, alto, tenor, and bass. Sound type and voice type are important for generating transformed concept 1010 and transformed concept definition 1020. Volume may be set at levels, such as low, medium, or high, or 1 through 10, and so on. The selection of various values may be based on explicit user selection, user preferences as provided by a user or as deduced by publishing platform 305, or may simply be based on default values.

At block 1210, for each concept on each page of a multilayered document, western classical composition 1005 (corresponding to the concept) and western classical composition 1015 (corresponding to the concept definition) are generated based on the values computed in block 1205, such that composition 1005 has a runtime corresponding to interval T1 and composition 1015 has a runtime corresponding to interval T3 (referring to FIG. 10A). The compositions 1005 and 1015 will become part of a sensory layer, such as a sensory layer 340, of the multilayered document, such as document 300.

In some embodiments, a progression of the concepts in the pages will influence the sounds associated with the sensory compositions. Accordingly, in one embodiment, two concepts that appear consecutively may have sensory compositions that are on a C-major ascending scale. For example, as illustrated in FIGS. 3 and 10B respectively, concepts C3*a* and C3*b* are consecutive, and accordingly, their respective compositions 1005 and 1075 are related in that they are on a C-major ascending scale.

At block 1220, for each concept on each page of a multilayered document, concept identifier data, such as data 275, and concept definition 261 are transformed into hearing type content, such as, into voice-over speech to generate transformed concept 1010 and transformed definition 1020 respectively. The transformations are generated based on the values computed in block 1205, such that transformed concept 1010 has a runtime corresponding to interval T2 and composition 1020 has a runtime corresponding to interval T4 (referring to FIG. 10A). The transformed content 1010 and 1020 will also become part of a sensory layer, such as a sensory layer 340, of the multilayered document, such as document 300.

The process continues until the last concept in page N is reached. Once the next page N+1 is loaded, the sound properties may be set to the next ascending scale, e.g., from C to D.

At 1230, once the last page is reached, the sensory compositions and transformed content and associated interactive markers are aggregated into a new document layer, such as sensory layer 340. At 1240, sensory content packaging module 635 computes the aggregate runtime of the western classical sensory layer.

At 1250, the unified composition segment is transposed into standard musical notation by sensory content packaging module 635. FIG. 10A provides a snapshot of a segment 1030 of the standard musical notation. FIG. 10B provides a snapshot of a segment 1050 of the standard musical notation. Segment 1030 can be interpreted by a suitable musical player (human or machine). A corresponding music sheet may be composed in western notation, and exported, such as into HTML, ePub formats.

At 1260, the sensory layer is exported by export module 630 into a .wav or similar file (such as, a music track), which can be streamed and played back by a connected digital music player.

Figure 13:
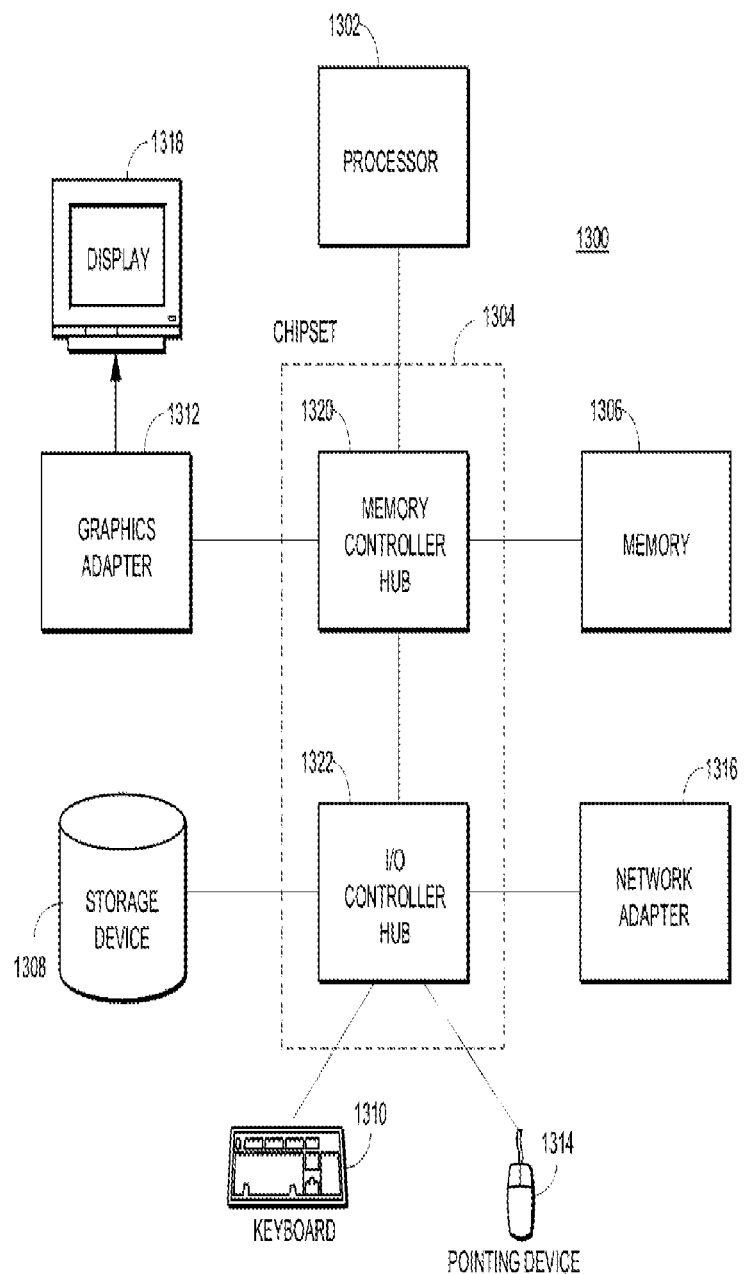
FIG. 13 is a high-level block diagram of a computer for use as a client device, according to one embodiment.

A high-level block diagram of a computer 1300, as an example of a user device 530, or as may provide computing necessary to operate various modules and systems in FIGS. 1-12, is illustrated in FIG. 13. Illustrated are at least one processor 1302 coupled to a chipset 1304. The chipset 1304 includes a memory controller hub 1320 and an input/output (I/O) controller hub 1322. A memory 1306 and a graphics adapter 1312 are coupled to the memory controller hub 1320, and a display device 1318 is coupled to the graphics adapter 1312. A storage device 1308, keyboard 1310, pointing device 1314, and network adapter 1316 are coupled to the I/O controller hub 1322. Other embodiments of the computer 1300 have different architectures. For example, the memory 1306 is directly coupled to the processor 1302 in some embodiments.

The storage device 1308 is a non-transitory computer-readable storage medium such as a hard drive, compact disk read-only memory (CD-ROM), DVD, or a solid-state memory device. The memory 1306 holds instructions and data used by the processor 1302. The pointing device 1314 is a mouse, track ball, or other type of pointing device, and is used in combination with the keyboard 1310 to input data into the computer 1300. The graphics adapter 1312 displays images and other information on the display device 1318. The network adapter 1316 couples the computer 1300 to a network. Some embodiments of the computer 1300 have different and/or other components than those shown in FIG. 13. The types of computer 1300 can vary depending upon the embodiment and the desired processing power. Other computing devices may alternatively be used as the user device 530, such as a tablet, a smart phone, an Internet television, or a gaming console, and so on.

Additional Configuration Considerations

The present invention has been described in particular detail with respect to several possible embodiments. Those of skill in the art will appreciate that the invention may be practiced in other embodiments. The particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer and run by a computer processor. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

In addition, the present invention is not limited to any particular programming language. It is appreciated that a variety of programming languages may be used to implement the teachings of the present invention as described herein, and any references to specific languages, such as HTML or HTML5, are provided for enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A method for generating sensory content associated with electronic content, the method comprising:
reconstructing a foundation document into a multi-layered document in a markup language format, the multi-layered document including a document layer corresponding to the foundation document and a plurality of sensory layers each corresponding to a different sensory type;
automatically identifying a set of concepts associated with the multi-layered document;
mapping a plurality of spatial locations of appearance of the set of concepts in the multi-layered document;
computing a plurality of sensory content records for the set of concepts for placement in the plurality of sensory layers;
associating a plurality of interactive markers with the plurality of spatial locations, respectively, wherein the plurality of interactive markers indicate presence of sensory content records in the plurality of sensory layers;

placing the plurality of interactive markers in an aggregate marker layer that is different from the document layer and the plurality of sensory layers.

2. The method of claim 1, wherein:

each of the sensor content records corresponds to a sensory type; and computing the plurality of sensory content records comprises generating a sensory composition of one or more sensory inputs from a database based on one or more rules associated with the sensory type of one of the sensory content records.

3. The method of claim 2, wherein at least one of the sensory content records further includes a sensory transformation of an identifier associated with an associated concept, wherein a sensory type of the sensory transformation of the identifier is selected based on a sensor type of the sensory content record.

4. The method of claim 1, further comprising: aggregating the sensory content records and associated linked interactive markers to generate a sensory content layer of the multi-layered document.

5. The method of claim 1, wherein one of the interactive markers includes at least one user interface element that is used by an end user to access an associated sensory content record.

6. The method of claim 1, wherein at least one of the sensory content records includes sensory content associated with a concept and a sensory composition for a definition associated with the concept, the sensory content associated with the concept and the sensory composition for the definition being of a first sensory type.

7. The method of claim 1, wherein the multi-layered document further comprises at least one of:
a user-generated content layer;
a learning activities layer;
a concept layer; or
a concept definition layer.

8. The method of claim 1, further comprising rendering the sensory content records while displaying the multi-layered document, wherein the rendering comprises rendering a plurality of components of the sensory content records in a sequence.

9. A system for generating sensory content associated with electronic content, comprising one or more processors and a non-transitory computer readable medium storing instructions that, when executed by one or more processors, cause the system to perform operations comprising:

reconstructing a foundation document into a multi-layered document in a markup language format, the multi-layered document including a document layer corresponding to the foundation document and a plurality of sensory layers each corresponding to a different sensory type;

automatically identifying a set of concepts associated with the multi-layered document;

mapping a plurality of spatial locations of appearance of the set of concepts in the multi-layered document;

computing a plurality of sensory content records for the set of concepts for placement in the plurality of sensory layers;

associating a plurality of interactive markers with the plurality of spatial locations, respectively, wherein the plurality of interactive markers indicate presence of sensory content records in the plurality of sensory layers;

placing the plurality of interactive markers in an aggregate marker layer that is different from the document layer and the plurality of sensory layers.

10. The system of claim 9, wherein:

each of the sensor content records corresponds to a sensory type; and computing the plurality of sensory content records comprises generating a sensory composition of one or more sensory inputs from a database based on one or more rules associated with the sensory type of one of the sensory content records.

11. The system of claim 9, wherein the operations further comprise: aggregating the sensory content records and associated linked interactive markers to generate a sensory content layer of the multi-layered document.

12. The system of claim 10, wherein at least one of the sensory content records further includes a sensory transformation of an identifier associated with an associated concept, wherein a sensory type of the sensory transformation of the identifier is selected based on a sensor type of the sensory content record.

13. The system of claim 9, wherein one of the interactive markers includes at least one user interface element that is used by an end user to access an associated sensory content record.

14. The system of claim 9, wherein at least one of the sensory content records includes sensory content associated with a concept and a sensory composition for a definition associated with the concept, the sensory content associated with the concept and the sensory composition for the definition being of a first sensory type.

15. The system of claim 9, wherein the multi-layered document further comprises at least one of:
a user-generated content layer;
a learning activities layer;
a concept layer; or
a concept definition layer.

16. The system of claim 9, wherein the operations further comprise rendering the sensory content records while displaying the multi-layered document, wherein the rendering comprises rendering a plurality of components of the sensory content records in a sequence.

17. A non-transitory computer-readable storage medium, configured with instructions executable by one or more processors to cause the one or more processors to perform operations comprising:

reconstructing a foundation document into a multi-layered document in a markup language format, the multi-layered document including a document layer corresponding to the foundation document and a plurality of sensory layers each corresponding to a different sensory type;

automatically identifying a set of concepts associated with the multi-layered document;

mapping a plurality of spatial locations of appearance of the set of concepts in the multi-layered document;

computing a plurality of sensory content records for the set of concepts for placement in the plurality of sensory layers;

associating a plurality of interactive markers with the plurality of spatial locations, respectively, wherein the plurality of interactive markers indicate presence of sensory content records in the plurality of sensory layers;

placing the plurality of interactive markers in an aggregate marker layer that is different from the document layer and the plurality of sensory layers.

18. The medium of claim 17, wherein:

each of the sensor content records corresponds to a sensory type; and computing the plurality of sensory content records comprises generating a sensory composition of one or more sensory inputs from a database based on one or more rules associated with the sensory type of one of the sensory content records.

* * * * *